US004001616B2

United States Statutory Invention Registration [19]

[11] Reg. Number: H1616

Wolfe

[45] Published: Dec. 3, 1996

[54] WEB INSPECTION SYSTEM HAVING ENHANCED VIDEO SIGNAL PREPROCESSING

[75] Inventor: Kenneth I. Wolfe, Maplewood, Minn.

[73] Assignee: Minnesota Mining and Manufacturing Company, St. Paul, Minn.

[21] Appl. No.: 251,375

[22] Filed: May 31, 1994

[51] Int. Cl.[6] ..... H04N 7/18

[52] U.S. Cl. ..... 348/88; 348/86; 348/92; 348/241; 348/250

[58] Field of Search ..... 348/88, 86, 92, 348/241, 243, 246–247, 250, 257; 382/8

[56] References Cited

U.S. PATENT DOCUMENTS

| | | | |
|---|---|---|---|
| Re. 33,357 | 9/1990 | Randall | 250/570 |
| 3,976,836 | 8/1976 | Wheeler | 178/7.3 DC |
| 4,118,730 | 10/1978 | Lemelson | 348/94 |
| 4,240,110 | 12/1980 | Henry | 348/88 |
| 4,297,587 | 10/1981 | Baker | 250/563 |
| 4,388,648 | 6/1983 | Harwood et al. | 348/625 |
| 4,403,294 | 9/1983 | Hamada et al. | 364/507 |
| 4,509,076 | 4/1985 | Yoshida | 348/133 |
| 4,525,741 | 6/1985 | Chahal et al. | 348/255 |
| 4,549,215 | 10/1985 | Levine | 348/257 |
| 4,559,603 | 12/1985 | Yoshikawa | 364/491 |
| 4,602,291 | 7/1986 | Temes | 348/243 |
| 4,635,118 | 1/1987 | Batra et al. | 348/625 |
| 4,712,010 | 12/1987 | Alm | 250/334 |
| 4,713,694 | 12/1987 | Zwirn | 348/691 |
| 4,724,481 | 2/1988 | Nishioka | 348/133 |
| 4,757,386 | 7/1988 | Sanner | 348/257 |
| 4,821,337 | 4/1989 | Alm | 382/58 |
| 4,835,606 | 5/1989 | Peck | 348/164 |
| 4,868,389 | 9/1989 | Moore | 250/332 |
| 4,948,964 | 8/1990 | Gohlke | 350/350 |
| 4,950,911 | 8/1990 | Williams et al. | 250/563 |
| 4,951,223 | 8/1990 | Wales et al. | 364/507 |
| 4,963,963 | 10/1990 | Dorman | 348/164 |
| 4,972,091 | 11/1990 | Cielo et al. | 250/562 |
| 4,974,261 | 11/1990 | Nakahara et al. | 382/22 |
| 4,994,917 | 2/1991 | Takayama | 348/250 |
| 4,996,529 | 2/1991 | Connell | 341/118 |
| 5,010,408 | 4/1991 | Toohey | 348/250 |
| 5,040,057 | 8/1991 | Gilblom et al. | 348/88 |
| 5,047,861 | 9/1991 | Houchin et al. | 348/247 |

(List continued on next page.)

FOREIGN PATENT DOCUMENTS

| | | | |
|---|---|---|---|
| 0543629 | 11/1992 | European Pat. Off. | G01N 21/89 |
| WO89/10037 | 10/1989 | WIPO | H04N 3/00 |

*Primary Examiner*—Bernarr E. Gregory
*Attorney, Agent, or Firm*—Gary L. Griswold; Walter N. Kirn; Charles D. Levine

[57] ABSTRACT

A web inspection system that inspects a moving web for defects has an enhanced video signal preprocessing capability. The enhanced video signal preprocessing is provided by a preprocessing circuit which has a maximum signal-to-noise (S/N) ratio that is no greater than an inherent maximum S/N ratio of a raw video signal as generated by a charge-coupled device CCD camera. The preprocessing circuit is preferably DC-coupled to the CCD camera to receive the raw video signal and generate an analog filtered video signal using an adaptive feedback loop that preserves a fidelity of the raw video signal in generating the filtered video signal. By improving the video signal preprocessing, the overall defect detection consistency of the web inspection system is improved.

20 Claims, 13 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 5,068,799 | 11/1991 | Jarrett, Jr. | 364/507 |
| 5,086,343 | 2/1992 | Cook et al. | 348/247 |
| 5,101,271 | 3/1992 | Andrews et al. | 348/246 |
| 5,105,276 | 4/1992 | Schrock | 348/241 |
| 5,118,195 | 6/1992 | Dobbie | 356/430 |
| 5,132,791 | 7/1992 | Wertz et al. | 348/88 |
| 5,150,175 | 9/1992 | Whitman et al. | 356/429 |
| 5,157,500 | 10/1992 | Gusmano | 348/241 |
| 5,181,118 | 1/1993 | Kimura | 348/243 |
| 5,245,425 | 9/1993 | Klatt | 348/164 |
| 5,252,818 | 10/1993 | Gerlach et al. | 348/250 |
| 5,303,064 | 4/1994 | Johnson et al. | 358/406 |
| 5,365,596 | 11/1994 | Dante et al. | 382/8 |
| 5,396,280 | 3/1995 | Caiozza | 348/241 |

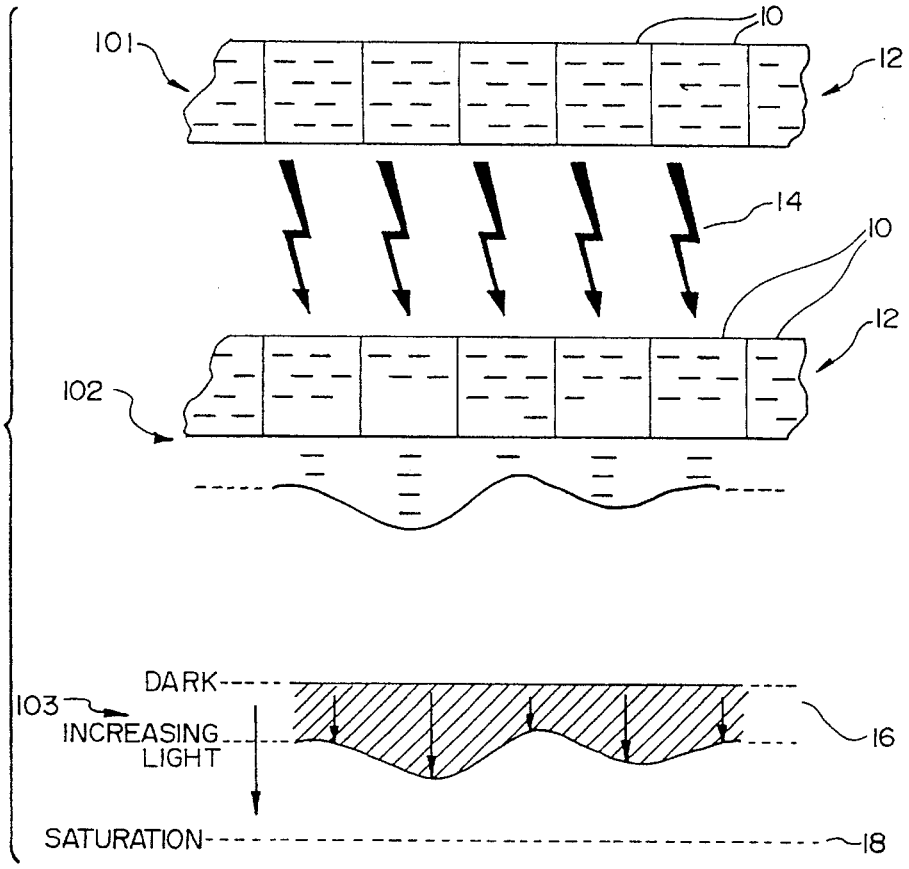
Fig. 1
Fig. 2
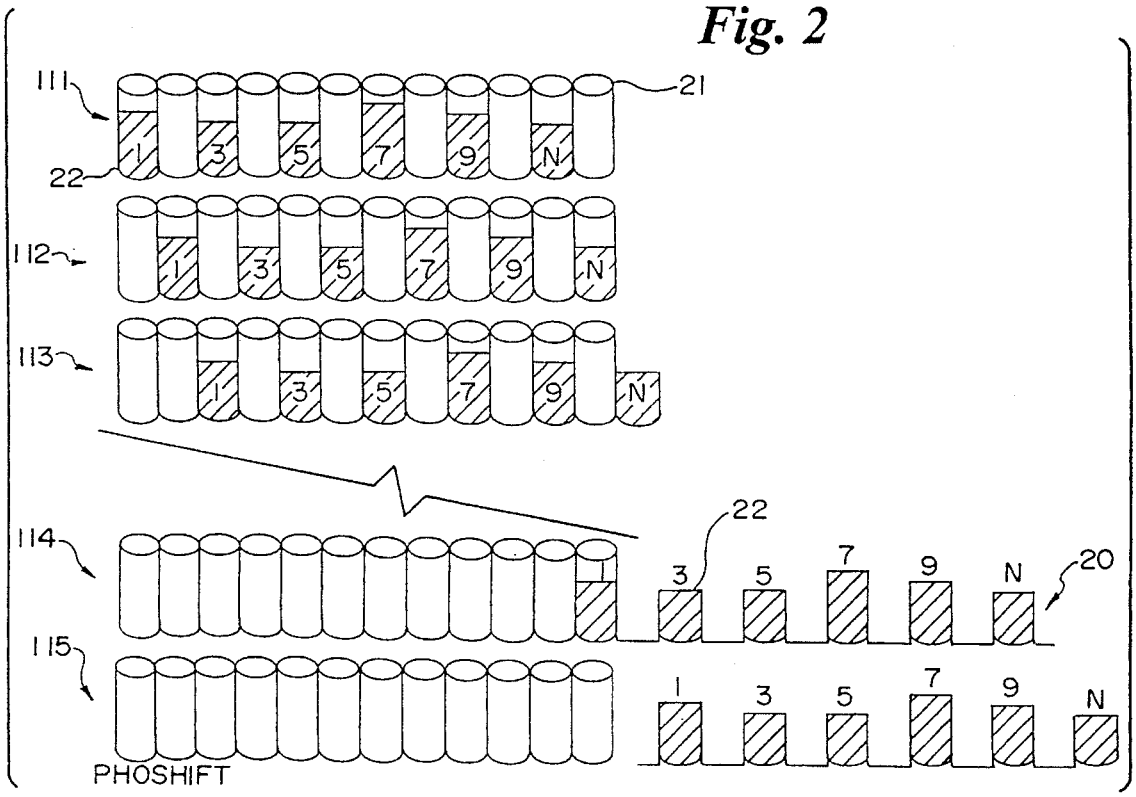

WEB INSPECTION SYSTEM HAVING ENHANCED VIDEO SIGNAL PREPROCESSING

RELATED APPLICATIONS

This application relates to two co-pending applications assigned to the assignee of the present invention and filed in the United States Patent and Trademark Office concurrently herewith, the first of which is entitled "Automatic Dark Level Zeroing Circuit For A CCD Camera", Ser. No. 08/251,797, and the second of which is entitled "Automatic Pixel Balancing Circuit For A CCD Camera", Ser. No. 08/250,820, both of which are incorporated by reference in the present application and a copy of each of which is attached hereto.

FIELD OF THE INVENTION

The present invention relates generally to vision inspection systems and, more particularly, to a web inspection system having enhanced video signal preprocessing capabilities for a raw video signal generated by a charge coupled device (CCD) camera.

BACKGROUND OF THE INVENTION

Vision inspection systems are well known. Generally, vision inspection systems can be divided into two categories, laser-based vision inspection systems which utilize a reflected or coherent laser light source to scan an object being inspected, as shown for example in U.S. Pat. Nos. 4,297,587 and 4,972,091, and camera-based vision inspection systems which utilize a suitable light source other than a laser light source to illuminate an object being inspected, as shown for example in U.S. Pat. Nos. 4,118,730 and 4,559,603. The present invention is concerned only with camera-based vision inspection systems.

The most prevalent type of camera used for camera-based vision inspection systems is a charge coupled device (CCD) camera. In a CCD camera, a charge coupled device is used as the mechanism to read out the values measured by a scan array of light sensors. There are two different kinds of CCD cameras that are typically used with CCD camera-based vision inspection systems: area scan cameras and line scan cameras. Although both types of CCD cameras use the same electronics to generate a video signal, the primary difference between area scan cameras and line scan cameras is that each type of camera produces a different type of video output signal.

In both cases, the CCD camera produces a video output signal representative of the light received by the scan array of light sensors during a predetermined period of time referred to as the camera scan time. The video output signal from an area scan camera is a composite video signal that includes a front porch and back porch having encoded reference values, as well as a composite sync signal. The reference values are used to decode the information contained between the front porch and back porch of the composite video signal. The sync signal is used to synchronize a series of lines of composite video signals that will be combined together to represent the area being scanned. In contrast, the video output signal of a line scan camera has no composite sync signal because only a single line is being scanned, not an entire area. In addition, there are no front porch and back porch portions of the video output signal of a line scan camera, although the video output signal of a line scan camera does include a black reference value.

The information portion of the video output signal generated by a CCD camera consists of a voltage signal referred to as the pedestal. During a first portion of the camera scan time, light striking a photosite in the scan array will discharge or decrease a reference charge level to which the photosite has been precharged. During a second portion of the camera scan time, the charge level remaining at the photosite is transferred out of the scan array using the charge-coupled device read out mechanism. As a result, the pedestal is the difference between the reference charge level and the charge level that remains at the end of the first portion of the camera scan time. These differences in charge levels are representative of differences in light received by different photosites from different locations in the focal plane of the CCD camera.

Camera-based vision inspection systems are very useful for detecting defects in objects, particularly in the surfaces of objects and defects contained in the base material such as dirt particles or holes by detecting and analyzing the deviations in the video output signal as compared to an expected video output signal if the object had no defects. U.S. Pat. Nos. 4,403,294, 4,509,076 and 4,974,261, and European Patent Appl. 0 543 629 A1, all show defect detection systems that utilize an area scan camera to detect defects in the surface of a stationary object. U.S. Pat. Nos. 4,240,110, 4,951,223 and 5,118,195 show vision inspection systems that utilize an area scan camera to detect defects in moving objects, particularly elongated strips or webs of material. Because the movement of the web relative to the camera allows a line scan camera to scan the entire web using only a successive series of line scans, and because the video output signal of a line scan camera is relatively simpler to analyze than the video output signal of an area scan camera, most web inspection systems utilize a line scan camera, rather than an area scan camera, as the mechanism to scan the moving web of material. Web inspection systems employing a line scan camera are shown, for example, in U.S. Pat. Nos. 4,724,481, 5,068,799, 5,132,791 and U.S. Pat. Re. No. 33,357.

Most web inspection systems utilize some type of digital signal processing techniques to analyze and detect defects in the video output signal. Typically, a video output signal from a CCD camera is supplied to an analog-to-digital (A/D) converter so as to generate a stream of digital bits representative of the video image of the web of material moving past the CCD camera. The use of digital signal processing to analyze and detect defects has made web inspection systems more adaptable to a wider variety of web inspection problems and, in most cases, has increased the accuracy of the web inspection process.

Prior to supplying the video output signal to the A/D converter, it is helpful to filter the raw video output signal using a preprocessing circuit. Preprocessing circuits are used to enhance the effectiveness of the A/D converter by filtering the raw video output signal to produce a filtered video output signal. In most cases, the preprocessing circuitry will remove a large DC bias offset that is part of the raw video signal and will combine separate video streams from the odd and even photosites in the scan array into a single filtered video signal. In many instances, preprocessing is performed internal to the CCD camera such that the raw video signal from the scan array is not even available as an output signal from the CCD camera. In higher quality CCD cameras of the type used for web inspection systems, the raw video signal, as well as a filtered video signal, are typically available as outputs from the CCD camera.

The problem with digital signal processing of the video signal in a web inspection system is that the digital signal processing can only be as accurate as the accuracy of the A/D conversion of the original video signal. In the case where video preprocessing circuits are used, the accuracy of the A/D conversion is necessarily limited by the accuracy of the video preprocessing circuit. Unfortunately, existing video preprocessing circuitry for line scan cameras can lose valuable signal information and may actually introduce additional error into the video signal.

The consequence of introducing errors into the video output signal are particularly significant for a web inspection system. Unlike a video signal from a VCR camera, for example, where the video signal is intended to be viewed as an entire picture, a video signal that is used by a high performance web inspection system may be analyzed on a pixel-by-pixel basis. While an occasional glitch or light spot in a VCR recording will most likely go unnoticed by the viewer, even a single pixel error or variance can result in the detection of a false defect, known as a false positive. If there are too many false positives generated by the web inspection system, the result can be an incorrect rejection of huge amounts of web material.

As an example, high performance web inspection systems typically scan a jumbo of rolled web material that is 7315 m (8000 yards) long and 1.52 m (60 inches) wide. In this example, if the web inspection system is attempting to detect defects that are as small as 2.5 $mm^2$ ($1/16 inch^2$), there will be a total of 4,400,000,000 potential defect sites in a jumbo that need to be scanned. If the defect rate at which the entire jumbo will be rejected is set at 5 defects/jumbo, then a web inspection system which is configured to check for defects as small as one pixel must consistently distinguish actual defects from false defects with a defect detection consistency rating of no more than one pixel variance/billion pixels scanned.

Regardless of what type of digital signal processing techniques are used, if the underlying video output signal provided to the A/D converter is itself not as consistent as the desired consistency rating, then there is no way to improve the defect detection consistency of the overall web inspection system. Consequently, a web inspection system that uses a CCD camera having enhanced video signal preprocessing capabilities would be greatly appreciated.

SUMMARY OF THE INVENTION

The present invention is a web inspection system for inspecting a moving web for defects that has an enhanced video signal preprocessing. The enhanced video signal preprocessing is provided by a preprocessing circuit which has a maximum signal-to-noise (S/N) ratio that is no greater than an inherent maximum S/N ratio of a raw video signal as generated by a charge-coupled device CCD camera. The preprocessing circuit is preferably DC-coupled to the CCD camera to receive the raw video signal and generate an analog filtered video signal using an adaptive feedback loop that preserves a fidelity of the raw video signal in generating the filtered video signal. By improving the video signal preprocessing, the overall defect detection consistency of the web inspection system is improved.

In accordance with a first aspect of the present invention, a web inspection system includes a CCD camera that uses a scan array comprised of a plurality of pixel photosites to produce an analog raw video signal representative of the moving web. The raw video signal includes a sync pulse for each scan period and has an inherent maximum signal-to-noise (S/N) ratio based on the electronic characteristics of the scan array and the CCD mechanism used to unload the scan array. A preprocessing circuit is operatively coupled to the CCD camera to receive the raw video signal and generate an analog filtered video signal for each scan period that has a preprocessing maximum S/N ratio no greater than the inherent maximum S/N ratio of the raw video signal. A post processing system is operatively coupled to the preprocessing circuit to receive the filtered video signal and evaluate the filtered video signal to detect video signals representative of defects in the moving web that are as small as a scan area in the moving web that is scanned by a single one of the plurality of pixel photosites.

In accordance with a second aspect of the present invention, a web inspection system for inspecting a moving web for defects includes a CCD camera that uses a scan array comprised of a plurality of pixel photosites to produce an analog raw video signal representative of the moving web. A preprocessing circuit DC-coupled to the CCD camera to receive the raw video signal and generate an analog filtered video signal using an adaptive feedback loop that preserves a fidelity of the raw video signal in generating the filtered video signal. A post processing system is operatively coupled to the preprocessing circuit to receive the filtered video signal and evaluate the filtered video signal for the existence of video signals representative of defects in the moving web. As a result, the web inspection system is capable of consistent detection of defects in the moving web.

In accordance with a third aspect of the present invention, a preprocessing circuit for web inspection system that inspects a moving web for defects is provided. The web inspection system includes a charge-coupled device (CCD) camera that uses a scan array comprised of a plurality of pixel photosites to produce an analog raw video signal representative of the moving web. The raw video signal is comprised of an even pixel video signal and an odd pixel video stream and at least one pixel photosite for the even pixel video signal and one pixel photosite for the odd pixel video signal are internally masked within the CCD camera. Each of the even pixel video signal and the odd pixel video signal include a sync pulse for each scan period and having an inherent maximum signal-to-noise (S/N) ratio. A post processing system receives a filtered video signal and evaluates the filtered video signal to detect video signals representative of defects in the moving web that are as small as a scan area in the moving web that is scanned by a single one of the plurality of pixel photosites. The preprocessing circuit includes a pair of separate adaptive feedback loops, an automatic pixel balancing circuit and a pixel recombining circuit. A first of the adaptive feedback loops is DC-coupled to the CCD camera to process the even pixel video signal and a second of the adaptive feedback loops is DC-coupled to the CCD camera to process the odd pixel video signal. Each adaptive feedback loop utilizes a portion of the raw video signal corresponding to the at least one pixel photosite that is internally masked to remove a dark level DC offset in the raw video signal and generate a zeroed video signal. The automatic pixel balancing circuit balances a zeroed even pixel video signal with a zeroed odd pixel video signal to generate a balanced even pixel video signal and a balanced odd pixel video signal. The pixel recombining circuit multiplexes the balanced even pixel video signal and the balanced odd pixel video signal to generate the filtered video signal for each scan period. As a result, the filtered video signal has a preprocessing maximum S/N ratio no greater than the inherent maximum S/N ratio of the raw video signal.

BRIEF DESCRIPTION OF THE DRAWINGS

FIG. 1 is a simplified sequential schematic representation of how a line scan camera develops charge values at the photosites in the array sensor.

FIG. 2 is a simplified sequential schematic representation of how charge values at each photosite are transferred out so as to generate a raw analog video output signal.

DESCRIPTION OF THE PREFERRED EMBODIMENT

Figure 3:
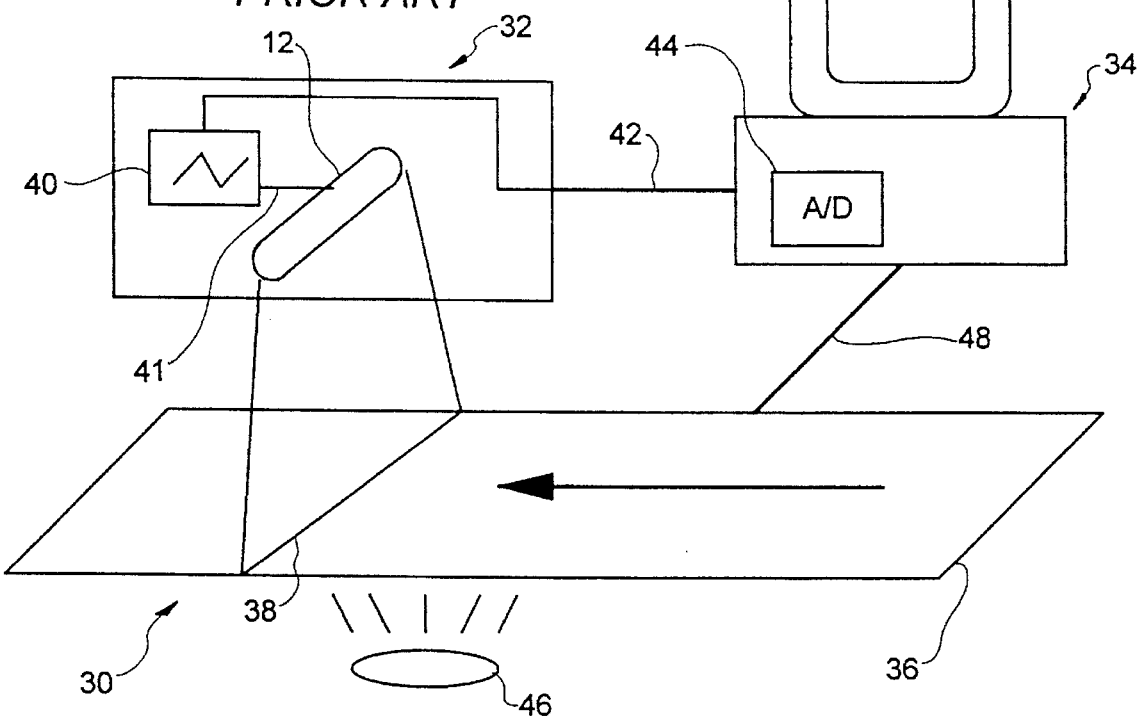
Fig. 3 PRIOR ART
FIG. 3 is a simplified block diagram of a typical web inspection system of the prior art that utilizes a line scan camera.

In order to provide a background for understanding the preferred embodiment of the present invention, a description of how a charge-coupled device (CCD) camera generates a video output signal is presented first. With this understanding in mind, a web inspection system in accordance with the present invention is broadly compared to the existing web inspection systems that utilize CCD cameras, and, in particular, line scan cameras. A detailed description of the various circuits of a preferred embodiment of the present invention is presented next. Finally, a comparison is made between the defect detection consistency of web inspection systems of the prior art and a web inspection system in accordance with the present invention.

Referring to FIG. 1, a simplified sequential schematic representation of how a CCD camera develops charge values at each of a series of photosites 10 in an array sensor 12 during a single camera scan time is shown. While it is sometimes convenient, when explaining the operation of a CCD camera, to refer to array sensor 12 as a line of miniature photocells, it should be understood that a photosite 10 operates in a manner that is different than the manner of operation of a traditional photocell. When a photocell is illuminated, the photocell produces an output voltage (or current) that is proportional to the intensity of light received. The duration of the light does not change the output voltage, only the light intensity. A photosite 10, on the other hand, operates somewhat differently in that each photosite 10 produces an output voltage that is proportional to both light intensity and light duration. That is, the output voltage is proportional to the integral of the input light.

In most cases, photosites 10 behave like a capacitor in that each photosite 10 can hold a charge. When light strikes a photosite 10, minority carriers are produced that permit the photosite capacitor to discharge the previously stored charge at a rate that is proportional to the intensity of the light striking photosite 10. As shown at time 101 in FIG. 1, all of photosites 10 in array sensor 12 are charged to a fixed reference voltage at the start of each camera scan. The polarity and magnitude of this reference voltage is determined by the camera manufacturer. In the Reticon LC1902 line scan camera as used in a preferred embodiment of the present invention, for example, photosites 10 are charged to a negative 3.6 volts at the start of each camera scan.

As shown at time 102 in FIG. 1, when light 14 strikes a given photosite 10 during a camera scan, some of the charge in that photosite is discharged. If the intensity and duration of light 14 striking the surface of photosite 10 is sufficient, all of the photosite charge will be discharged. This condition represents array saturation and is somewhat backwards from what a first-time user of a line scan camera might suspect. Light causes an existing voltage to be reduced, rather than causing a voltage to be directly produced as is the case in a traditional photocell. The actual video signal of interest in a line scan camera is the difference between the initial charge level of each photosite 10 and the charge level that remains at the end of the camera scan.

As shown at time 103 in FIG. 1, at the end of the time period for each camera scan, the voltage discharged by each photosite 10 is proportional to the total light intensity of light 14 that was absorbed by the surface of photosite 10 during the integration time period for that scan. Thus, a photosite 10 that experienced no light 14 during a scan would have a voltage value as shown at 16, which is sometimes referred to as the dark voltage or dark current value. A photosite 10 that discharged all of the photosite charge will have a saturation voltage value as shown at 18, which represents an array saturation condition. In between these two values represents the range of values from dark level to saturation level, depending upon the amount of light 14 that was received by photosite 10 during a camera scan. In the case of the Reticon LC1902 line scan camera, for example, the saturation voltage value 18 is a negative 2.9 volts and the dark level value 16 is negative 3.6 volts, resulting in a range of voltage values containing useful information of 700 millivolts that rides on a negative DC bias offset of −3.6 volts.

Before the start of the next scan, the photosite charges that remain from the previous scan are broadside (parallel) transferred to a pair of analog charge storage shift registers. All of the odd photosites 10, also known as pixels, are transferred to a first shift register and all of the even pixels or photosites 10 are transferred to a second shift register. This process is shown schematically in FIG. 2 for the odd photosites 10 in scan array 12. During this scan, the voltage values representing the charge remaining at photosites 10 for the previous scan are clocked into a shift register 20 serially. Although not shown in FIG. 2, at the same time, the voltage values from the previous scan are clocked out of shift register 20. Every other location 21 in shift register 20 is empty in FIG. 2 because a temporary storage site is required as part of the CCD mechanism as the stored charge is transferred out of scan array 12. At time 111, the charge packets or scan data 22 are shifted (clocked) from their initial locations to adjacent locations that are empty. This process continues as shown at times 112, 113, 114 and 115 until all of scan data 22 is clocked out of locations 21 in shift register 20. During this process, the same action is taking place for even photosites 10 being clocked to an even shift register (not shown). Naturally, there must be at least as many clock cycles as there are photosites 10 to clock out scan data 22, and actually a few additional clock cycles are required to perform certain camera housekeeping functions at the beginning of each camera scan. At the end of the clocking out, as shown at time 115, scan array 12 is now empty. The photosite charges are then reset (photosites 10 are re-charged to their fixed voltage) and a new scan begins.

At this point, the line scan camera has produced odd and even pixel streams that are still riding on the large DC offset voltage as represented by dark voltage value 16. For reasons that are discussed in detail later, this DC bias offset voltage must be stripped away, after which the odd and even pixel streams are combined into a contiguous video signal in order to produce a video signal that may be analyzed to detect defects observed by the line scan camera. The process of stripping away the DC offset voltage and combining the odd and even pixel outputs is referred to as video signal preprocessing. It is at this point that the present invention departs from existing line scan camera vision inspection systems.

FIG. 3 shows a block diagram of a typical existing web inspection system 30 that utilizes a line scan camera 32 and a post processing system 34 to detect defects in a moving web 36. Line scan camera 32 includes an scan array 12 along with associated circuitry to generate a video signal that is ultimately feed into post processing system 34. As web 36 moves in the direction indicated past a detection field 38 of line scan camera 32, scan array 12 will scan a transverse strip of web 36 that is of a predetermined width, depending upon the scan rate of line scan camera 12 and the traveling speed of web 36.

In existing web inspection systems, an internal preprocessing circuit 40 typically located within line scan camera 32 is used to filter a raw video output 41 from scan array 12 to produce a filtered video output signal 42 that is then fed to post processing system 34. While post processing system 34 can be an analog processing system, most current web inspection systems utilize a digital signal processing system in which filtered video output signal 42 is fed directly into an A/D converter 44 within post processing system 34 to generate a stream of digital bits representative of each scan of detection field 38 as web 36 moves along. In some "digital" line scan cameras 32, the portion of post processing system 34 that includes A/D converter 44 is included within camera 32 and the only externally available output signal is a stream of digital data from A/D converter 44.

Preprocessing circuit 40 almost always utilizes a high pass filter in the form of a capacitive coupling of raw video output 41 to filtered video output signal 42 to filter out the DC offset voltage represented by minimum voltage value 18. Alternatively, preprocessing circuit 40 could subtract from raw video output 41 a fixed reference voltage equal to dark voltage value 16. This is not usually done because the circuitry to accomplish this would be more complicated and because dark voltage value 16 may vary with variations in the ambient and operating conditions of scan array 12 and this variation would then introduce error into filtered video output signal 42. In addition, preprocessing circuit 40 will include circuitry to combine the outputs of the odd and even pixel shift registers. Typically, a manual gain potentiometer is used to provide a single point correction of pixel balance between the odd pixel and even pixel portions of preprocessing circuitry 40.

Post processing system 34 may be provided with a visual and/or audio output, such as display 44, that signals or displays information indicative of an identified defect in web 36. Alternatively, post processing system 34 may be provided with a control link 48 to the mechanism for advancing web 36 in order to stop the advancement of web 36 when a defect is identified, or preferably to mark web 36 at the point of the defect. Various other techniques for handling web 36 once a defect has been identified are well known in the art and it is contemplated that any one or more of these techniques could be used with a web inspection system in accordance with the present invention.

While significant improvements continue to be made in the way in which post processing system 34 identifies and handles defects detected in web 36, the present invention recognizes that the main problem with existing web inspection systems 30 is not in post processing system 34, but rather in the quality of video output signal 42 that is supplied to post processing system 34. Unfortunately, existing web inspection systems 30 rely on the preprocessing circuitry 40 that is included within or provided with line scan camera 32 to provide filtered video output signal 42. By failing to recognize that post processing circuitry 34 can only analyze defects down to the underlying quality of video output signal 42, existing web inspection systems unknowingly introduce errors into the web inspection process.

Because line scan cameras are manufactured to perform tasks beyond just web inspection, the manufacturers of line scan cameras do not address many of the particular preprocessing requirements that are specific to providing an enhanced video output signal for a web inspection system. As a result, in the case of providing a video output signal for use in a web inspection system 30, the inherent signal-to-noise (S/N) ratio of line scan camera 32 is effectively determined by the S/N ratio characteristics of preprocessing circuit 40, rather than by the inherent S/N ratio of scan array 12. Existing high quality line scan cameras 32 that are suitable for use with a web inspection system 30 typically have inherent overall S/N ratio values in the range of 6–25%. These values include the S/N ratio error which is introduced by preprocessing circuit 40. The actual inherent S/N ratio values for scan array 12 within these line scan cameras 32 is much lower, typically in the range of 1–6%.

The major problems which limit performance of the combination of line scan camera 32 and preprocessing circuit 40 are: (1) pixel dark level offset, (2) odd/even pixel balance, and (3) interpixel glitch. Generally, it has been found that, while most line scan camera vendors recognize the problem of pixel dark level offset, the solutions of capacitive coupling or substraction of a fixed reference voltage do not adequately address this problem for a high performance web inspection system. Moreover, none of the line scan camera vendors address the issue of pixel balance and none provide an adequate solution to the problem of interpixel glitch. To understand why each of these problems is so critical in a web inspection system, it is helpful to understand more about the particular requirements unique to high performance web inspection systems which dictate the high level of fidelity required in the video output signal which is to be analyzed to detect defects in the web.

Figure 4:
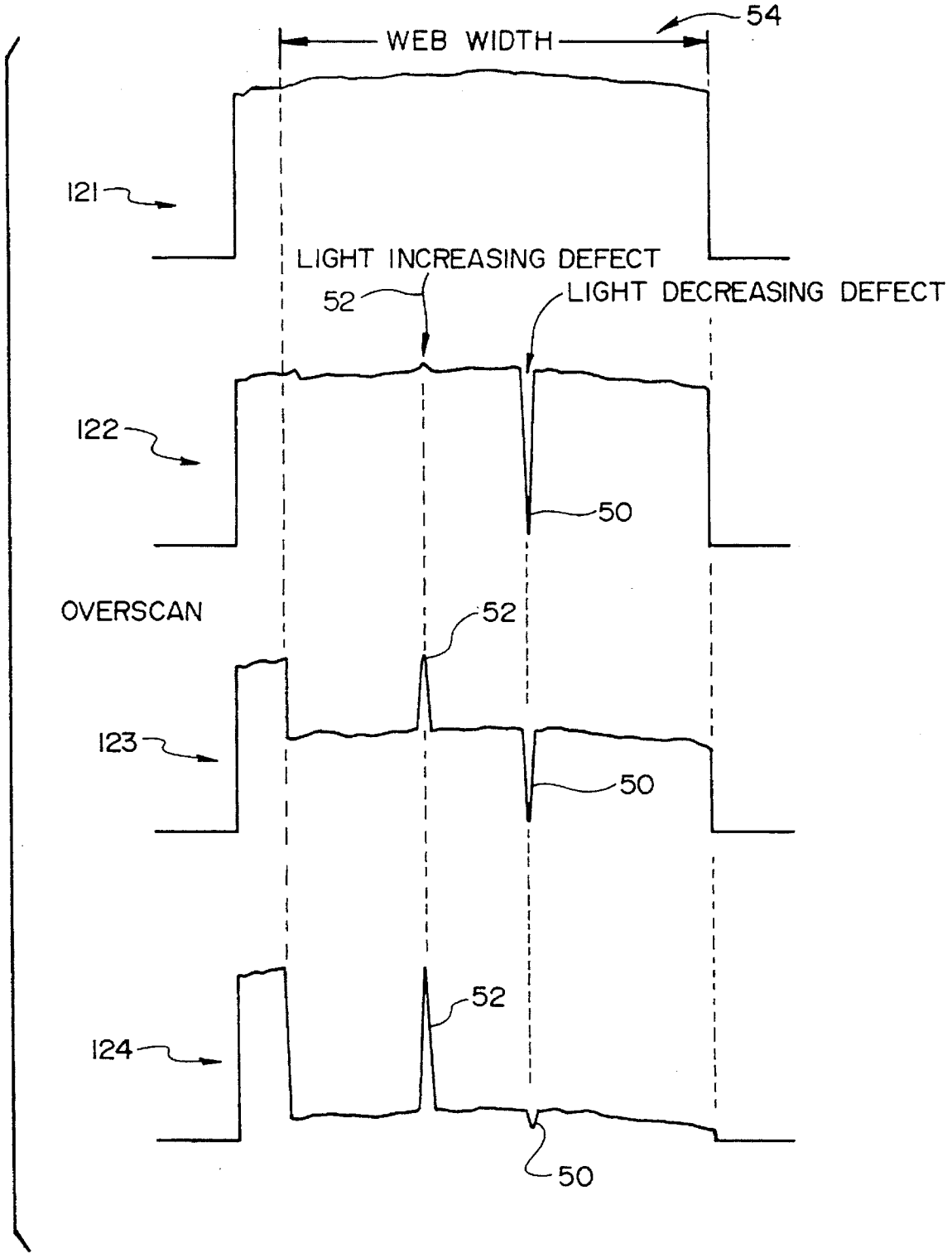
FIG. 4 is a sequential series of graphic representations of video output signals for various types of line scan camera detection fields.

Detection fields 38 of a line scan camera 32 are often spoken of as being either a "bright" field or a "dark" field. This is referring to the normal light that line scan camera 32 receives. Frequently, in a web inspection application, web 36 is located between line scan camera 32 and a non-laser light source 46. Video output signal 121 as shown in FIG. 4 illustrates a typical filtered video output signal 42 when line scan camera 32 is looking directly at light source 46 with no web material 36 in between. When a transparent web 36 is between line scan camera 32 and light source 46, as shown at video output signal 122, very little attenuation of the light occurs. This is known as a bright field web inspection. In this case, the only type of web defect that can be detected is a dark defect 50 that causes the light that is reaching line scan camera 32 to decrease, such as dirt, debris or web inclusions. Under these conditions, a light defect 52, such as a hole or opaque thinning in web 36, is very difficult to detect. A dark field web inspection is illustrated at video output signal 124. Here, no light, or very little light, reaches line scan camera 32. In this case, a light defect 52 allows light into detection field 38 and thus is easily detected, while a dark defect 50 is essentially undetectable. Finally, video output signal 123 illustrates an intermediate field produced by a translucent web material. In this case, the translucent nature of web 36 makes possible detection of both light increasing signal representative of light defects 52 and light decreasing signals representative of dark defects 50. As will be discussed, the present invention is applicable to all three different types of detection fields 38.

In addition to the different type of detection fields 38 which may be encountered in a web inspection environment, the resolution of line scan camera 32 is critical to high performance defect detection in a web inspection system. The resolution for a web inspection system consists of two components, crossweb resolution and downweb resolution. The crossweb resolution is determined first since crossweb resolution is independent of web speed. Crossweb resolution is a function of the crossweb pixel size of each photosite 10, the number of photosites 10 in scan array 12 and the total width of scan array 12. The crossweb pixel size for the Reticon LC1902 camera is 0.0127 mm (0.0005 inches). Multiplying this number by the number of pixels gives a physical length of the scan array 12. Dividing the web width, as shown at 54 in FIG. 4, by the array length gives a defect magnification value, which is the projected crossweb pixel dimension on the surface of web 36, as shown in FIG. 3.

The defect magnification value is useful in determining the camera stand-off of line scan camera 32 relative to web 36. If, for example, the camera has 256 pixel photosites, then the physical length of scan array 12 would be 0.325 cm (0.128 inches). For a web 36 having a width of 40 cm, the magnification value would be 40 cm/0.324 cm, or 123. Thus, the area of the projected crossweb pixel dimensions on the surface of web 36 would be $(123 * 0.0127)^2$, or 2.44 $mm^2$ (0.0037 $inches^2$). It will be obvious that larger scan arrays 12 will produce smaller defect magnification values, and, as a result, the minimum size of a defect which can be detected reliably by the web inspection system will decrease. For most high quality web inspection systems, this is the largest minimum detectable defect size that would be allowable.

To determine the downweb resolution, it is necessary to know a maximum web speed of web 36, as well as a scan rate for line scan camera 32. The scan rate may be determined knowing the pixel clock frequency and the length of scan array 12 in terms of the number of pixels or photosite 10. Scan rate is a function of the master clock and the number of clock cycles between the start of scan pulses. In essence, the combination of scan rate and web speed will determine how long a section of web 36 will pass by detection field 38 on each scan. It will be apparent that web speed has a very large impact on the performance of a web inspection system. If, for example, the scan rate is 2 KHz and the minimum desired resolution for detection is 0.01 inches, then the maximum web speed would be no more than 80 feet per minute.

Figure 5:
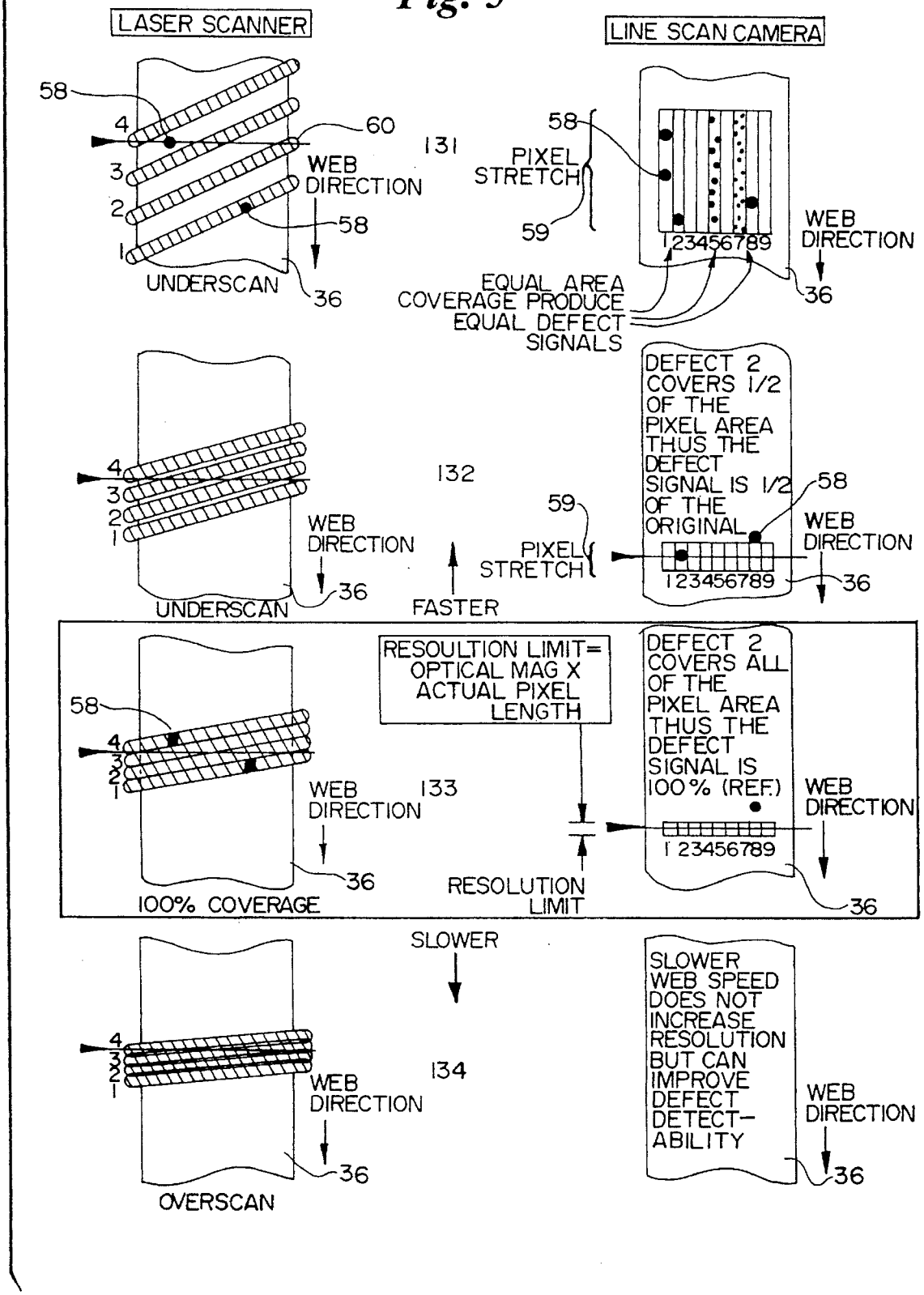
FIG. 5 is a sequential series of schematic comparisons of a laser scanner with a line scan camera demonstrating the effect of web speed on defect detection.

FIG. 5 illustrates the effect of web speed on downweb resolution and, perhaps more importantly, defect detectability. In this figure, a line scan camera is compared with a laser scanner and a series of schematic representations of the scanning of a web 36 at different speeds are shown for both types of scanning systems. Scan sample 133 is the reference scan for both cases. Where the web speed is such that web 36 travels a distance in one scan time equal to the width of the laser spot for these is 100% coverage and all defects 58 are "seen" by a laser scan line 60. For a line scan camera 32, 100% coverage can be defined for the case where web 36 travels a distance equal to the projected downweb pixel length on the web surface. The reference defect 58 shown in scan sample 133 "fills" the pixel area and produces the maximum defect signal amplitude that can occur.

As the web speed decreases from the reference speed for scan sample 133, as shown for example in scan sample 134, defects 58 will be seen by more than one scan, a condition known as downweb overscan, but the defect signal amplitude does not increase. As a result defect detectability does not improve unless two-dimensional signal processing techniques are used. Thus, it can be seen that the downweb resolution is limited to the defect magnification times the actual downweb pixel length.

As the web speed increases from the reference speed, as shown for example in scan sample 132, an effect commonly known as pixel stretch takes place, as shown for example at 59. If the web speed doubles, for example, twice the reference distance passes beneath line scan camera 32, but reference defect 58 is still the same size. Thus, the downweb pixel length appears to stretch with respect to the reference. The defect now covers half of this stretched pixel and the defect signal amplitude will be cut in half because the defect is present only for one half of the camera's integration time. For the laser scanner, the scan lines are beginning to separate, but defects 58 can still be detected.

When the web speed continues to increase, the condition as shown at scan sample 131 will exist. In this case, the laser scanner can actually miss defects 58, because they will travel by the laser scan between scans. A line scan camera is different. Because the line scan camera's duty cycle can approach 100%, the camera sees every defect 58, the only question is the amplitude of the signal representative of defect 58. Thus, even at high web speed, a line scan camera 32 has almost 100% web coverage. This characteristic, along with the lower cost and simpler operation of line scan cameras, are some of the reasons why line scan cameras are often preferred over laser scan systems for web inspection applications.

Although defect 58 will always be seen by line scan camera 32, the question is whether it will be detected. As the pixel stretches, a given defect area becomes a smaller and smaller portion of the area of the stretched pixel and, as a result, the defect signal amplitude decreases. If signals thresholds could be lowered without having a problem of background noise caused by one of the three problem identified above, such as interpixel glitch, pixel imbalance, or dark level offset, then the defect may still be detected, even though it produces a relative differential signal that is very small. Defect resolution is another matter. Because a line scan camera is integrating all light that it receives, two small defects cannot be distinguished from one larger defect in the downweb direction. Understanding this effect provides an understanding of why setting a realistic maximum web speed is so critical to effective high performance web inspection systems, and how indeterminacies can creep into the web inspection process.

Figure 6:
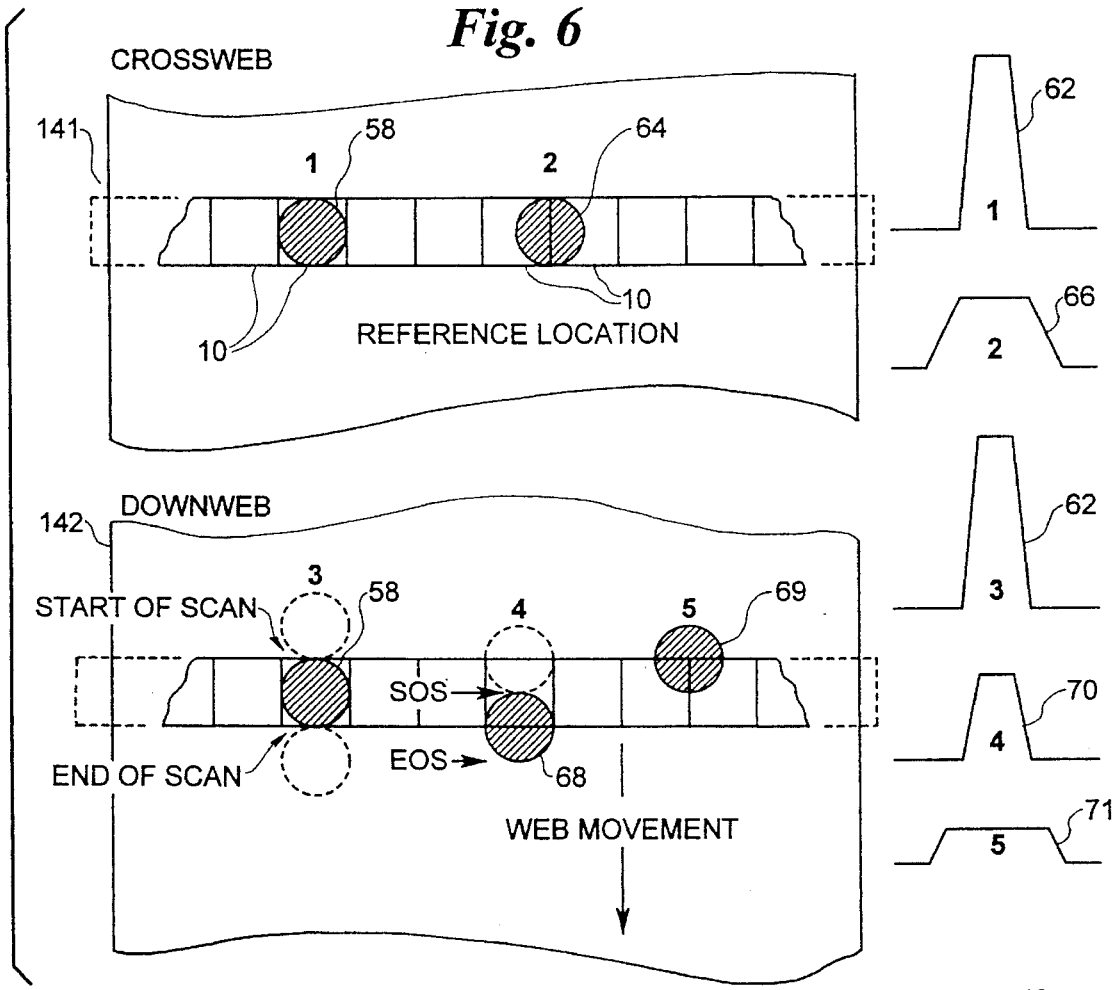
FIG. 6 is a pair of scan samples for demonstrating crossweb and downweb defect boundary conditions and the effect on resolution and defect detectability.

The previous discussion of resolution and defect detectability has assumed that defects 58 will occur in perfect registration with a given pixel photosite 10. This is obviously not the case. Before a defect occurs, its positional relationship to a pixel is unknown, and cannot be known. In FIG. 6, a reference defect 58 is registered with a pixel photosite 10 in scan 141. This reference defect 58 would produce reference signal 62. A defect 64, however, which splits a crossweb pixel boundary will not produce a video output signal having an amplitude as large as reference signal 62. If the split is 50–50, for example the resulting defect signal 66 will be one half of the amplitude of reference signal 62, but twice the width, because defect 64 is the same size as reference defect 58 and the total light received by both photosites 10 for defect 64 would be equal to the light received by the single photosite 10 for defect 58. In the downweb case, as shown in scan 142, a defect can split a scan boundary as shown by defect 68, or split both a pixel boundary and a scan boundary as shown by defect 69. In the case where a scan boundary is split, the resulting defect signal 70 will be one half the amplitude of reference signal 58, but will also be the same width. In the worse case for defect 69, the maximum amplitude for defect signal 71 is ¼ of reference signal 62, although the width of defect signal 71 is twice that of defect signal 70.

The effect of these boundary conditions on signal amplitude are in addition to that of pixel stretch. Naturally, as a defect gets larger and larger with respect to the pixel size, the effect of the boundary conditions become less and less critical. Because high performance web inspection systems desire to detect the smallest possible detect, however, the effect of these boundary conditions on defect detectability cannot be ignored. With this background in mind, the manner in which the present invention solves -the various problems that have limited the ability of existing web inspection systems to lower signal-thresholds and increase the resolution and defect detectability.

Figure 7:
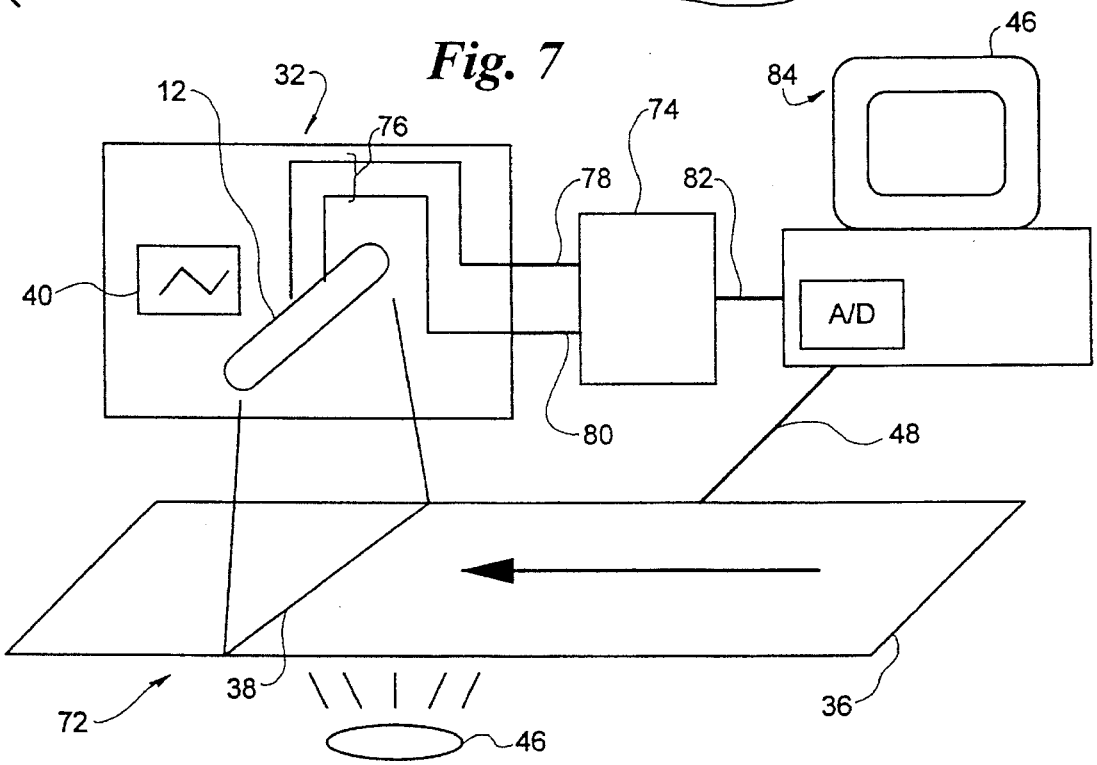
FIG. 7 is a simplified block diagram of a web inspection system in accordance with the present invention.

Referring now to FIG. 7, a simplified block diagram of a web inspection system 72 in accordance with the present invention will be described. As with prior art web inspection system 30, web inspection system 72 of the present invention includes a line scan camera 32 for scanning a moving web 36. Unlike web inspection system 30, however, web inspection system 72 does not utilize preprocessing circuit 40 within line scan camera 32. Instead, a unique preprocessing circuit 74 is directly supplied with a raw video output signal 76 from line scan camera 32. Raw video output signal 76 is comprised of an even pixel shift register signal 78 and an odd pixel shift register signal 80. As described in more detail later, preprocessing circuit 74 includes separate circuitry for processing even pixel signal 78 and odd pixel signal 80 to provide for automatic dark level zeroing of each signal 78 and 80, automatic balancing between even pixel signal 78 and odd pixel signal 80 and a glitch free reconstruction of even pixel signal 78 and odd pixel signal 80 to produce a combined filtered video output 82 that may be used by post processing system 84 to provide increased resolution and defect detectability as part of a high performance web inspection system 72. Post processing system 84 may be either an analog post processing circuit or a digital signal processing system, or any combination of these two. Unless otherwise noted, the remaining elements of web inspection system 72 are similar to elements with the same reference numerals in web inspection system 30.

Figure 8:
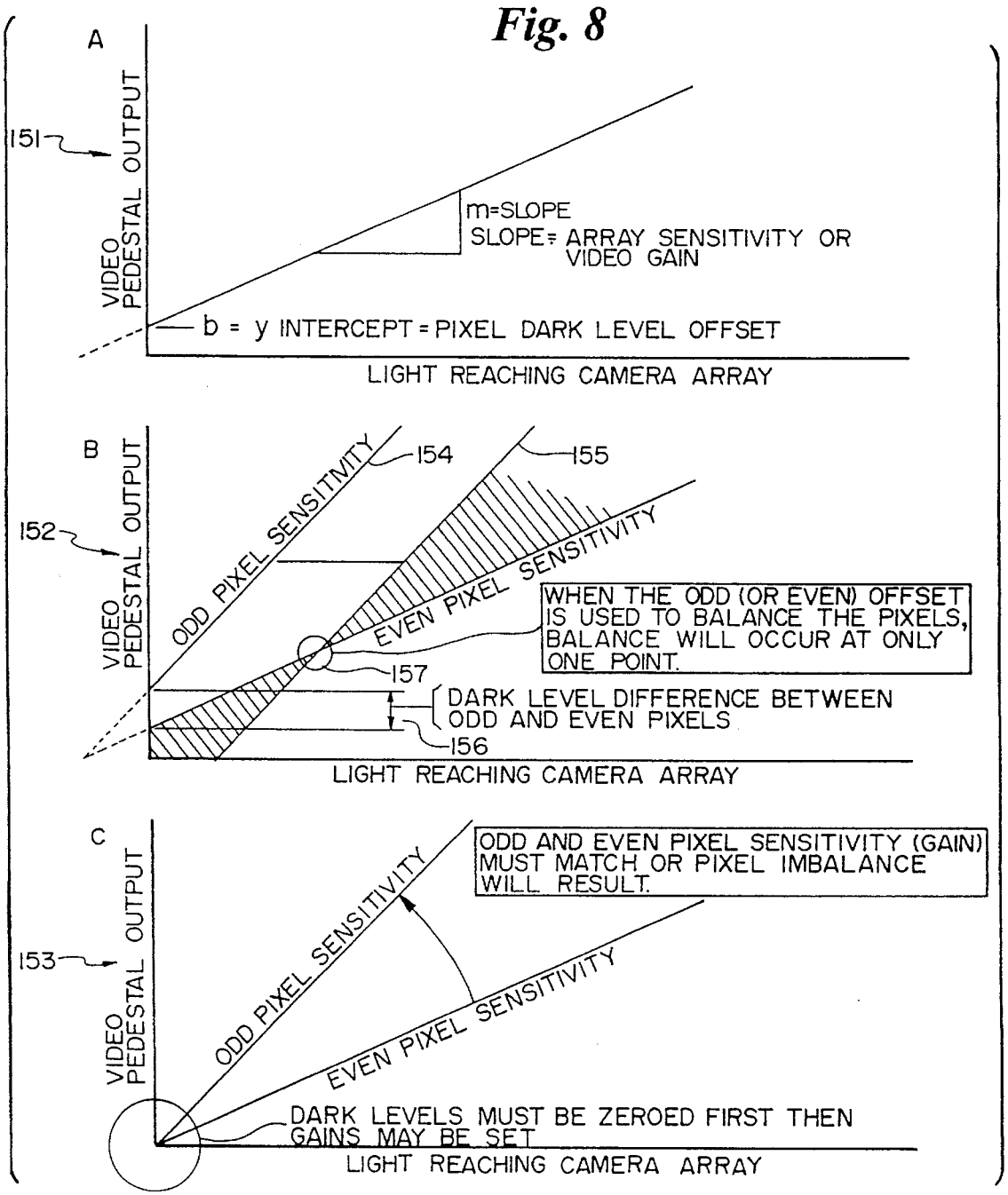
FIG. 8 is a series of graphic representations demonstrating the effect of dark level offset on pixel balance.

Referring now to FIG. 8, the manner in which the particular circuitry within preprocessing circuit 74 addresses both the problems of pixel dark level offset and odd/even pixel balance will be generally described. Pixel dark level offset is a problem when a signal is not zeroed before gain is applied, in which case an offset-gain interdependency exists that makes the acquisition of valid data very difficult. Any change in gain amplifies the DC offset as well. It should be understood that the odd and even photosites 10 for scan array 12 may not have the same sensitivity and most certainly do not ride on exactly the same dark level DC offsets as represented by dark voltage value 16 in FIG. 1. In addition, these dark levels DC offsets may vary with changes in ambient temperature and pixel clock frequency. The only way to avoid this problem is to make the DC offset equal to zero volts. This relationship is illustrated by graph 151 in FIG. 8 with the familiar y=mx+b equation. The b intercept is the dark level offset and the slope of the line is the camera sensitivity or gain.

When the odd and even pixels are combined, the video voltage levels should be the same when all of the pixels are receiving the same light. This is pixel balance. Good balance is essential for a high performance web inspection system. Poor balance will limit amplitude resolution and accuracy of the subsequent signal processing. As shown by graph 152 in FIG. 8, a single point pixel balance may be achieved by adjusting the DC offset of the odd video signal from line 154 to line 155. This is typically how existing preprocessing circuitry 40 will compensate for both dark level offset and pixel balance. In essence, preprocessing circuitry 40 of the prior art compensates for the dark level differences between even and odd pixels, as shown at 156, by adjusting the dark level offset of the video of either the even or odd pixel. The net result is that there is a single point 157 at which the video of both the odd and even pixel is balanced. Once balanced, preprocessing circuitry 40 then uses a simple AC capacitive coupling to eliminate the DC dark level offset, after which a DC restoration circuit restores the DC portion of the signal minus the DC dark level offset in order to extract the valuable information from the video signal.

The fundamental problem with this approach is that anything which changes the system gain, whether in the post processing electronics, the lens f-stop, or even ambient changes in the operating environment of web inspection system 30 will cause the combined video to move from balance point 157 and go out of balance. The problems that an offset adjustment of any kind can cause are difficult to overstate.

To solve the problems created by using a single balance point to compensate for both DC dark level zero and pixel balance, the preferred embodiment of the present invention uses an automatic DC dark level zeroing circuit as described in connection with the description of FIG. 13. The auto-zero circuit is part of preprocessing circuit 74 and automatically assures that the dark level DC offsets for both even pixel signal 78 and odd pixel signal 80 are each at 0 volts without adjusting or offsetting one signal level as compared to the other. As shown at graph 153 in FIG. 8, once the dark levels for both signal 78 and odd pixel signal 80 are at zero volts, then the gain of one of the channels can be adjusted to match the other. In the preferred embodiment, this is done by an automatic pixel balance circuit as described in connection with the description of FIG. 14. The auto-balance circuit is also part of preprocessing circuit 74 and compensates for subsequent gain changes or light level changes that affect both odd and even pixel such that these changes do not cause pixel imbalance. It will be noted that for dark detection fields, for example, the auto-balance circuit may be disabled by an operator to enhance control of the detection of defects in these type of detection fields.

Figure 9:
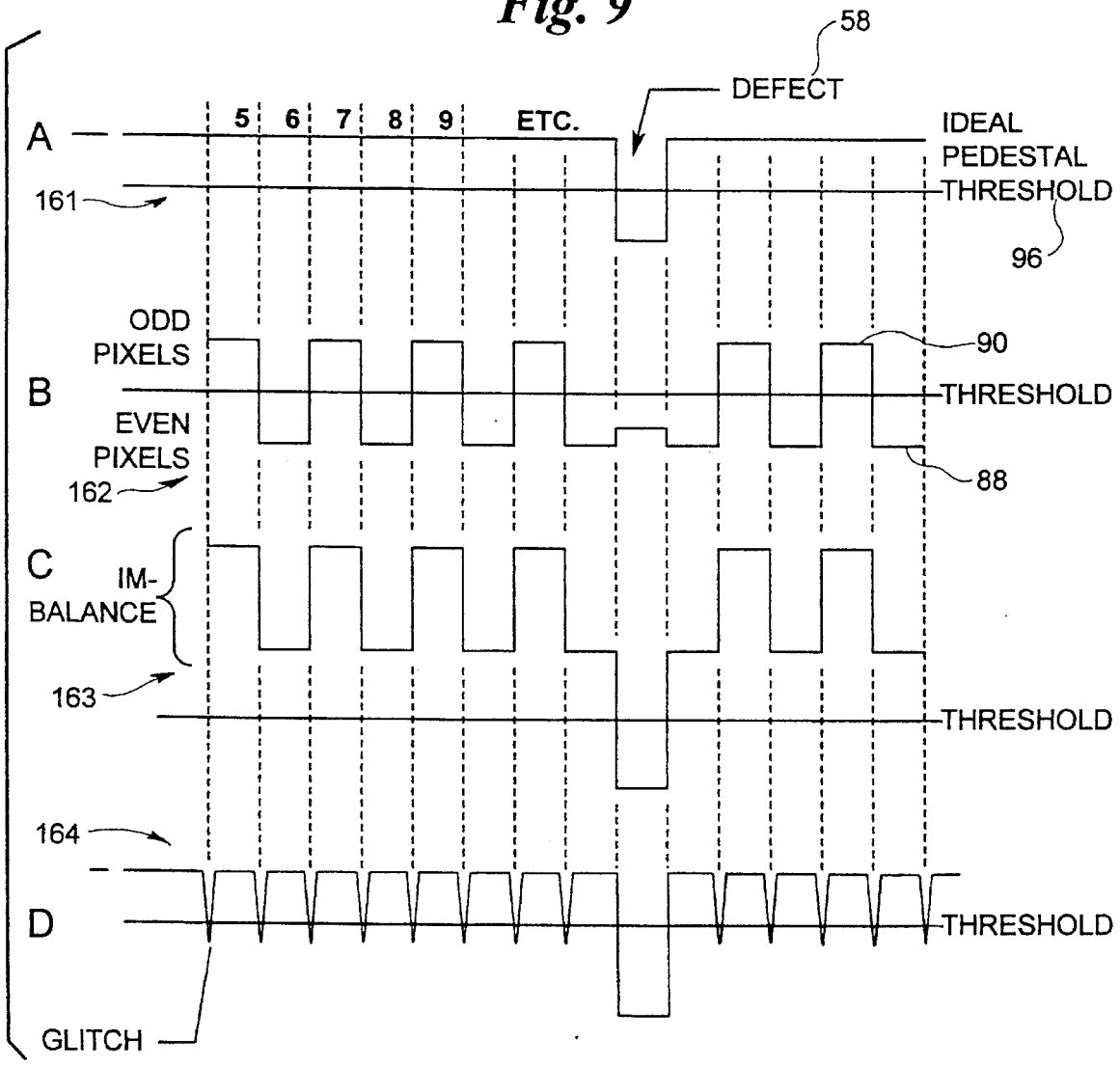
FIG. 9 is a series of graphic representations demonstrating the problem of interpixel glitch.

A problem similar to pixel imbalance also can exist for interpixel glitch. FIG. 9 shows a series of graphic representations of a video signal that has good pixel balance, yet has a large interpixel glitch. Although a negative interpixel glitch is shown, it will be understood that the glitch may be either positive or negative. Signal 161 shows the ideal pedestal for a defect 58, along with an intended defect threshold 96. Signal 162 shows the even pixel signal 88 and odd pixel signal 90 as generated by a scan array 12 without an imbalance, and signal 163 shows the same defect 58 with a pixel imbalance. Finally, signal 164 shows how glitches 98 can trigger threshold 96, thereby providing false detects. Gated comparators may be used to view the "clean" portion of the video signal, however, it will be appreciated that this places further constraints on the timing of preprocessing circuit 84.

In most cases, interpixel glitch is caused by timing inaccuracies in the way in which the odd and even pixels are combined to create a single video output signal. Most post processing circuits 34 digitize the input analog video signal when it is still in the form of odd and even pixel streams. The timing and delays in this flash conversion process are very critical. Often, just by replacing a camera or changing a cable length slightly, post processing circuit 34 will fails to acquire correct video due to a command pulse for the flash conversion process shifting across the odd/even pixel boundary as shown at 99. What was an even pixel is now an odd pixel and vice versa. In this case, the conversion command pulses are sampling the wrong pixels and all further processing is invalid. In the present invention, however, filtered video output 82 has no discreet pixel boundaries. The odd and even pixels merge smoothly without any discontinuity or interpixel glitch. While there still are odd and even pixels, because the pixels are completely contiguous, precise conversion command timing is no longer required. Just as the auto-zero and auto-balance functions eliminate any need for camera setup procedures, the ability to use arbitrary conversion in post processing system 34 guarantees that the electronics is always acquiring valid video.

Figure 10:
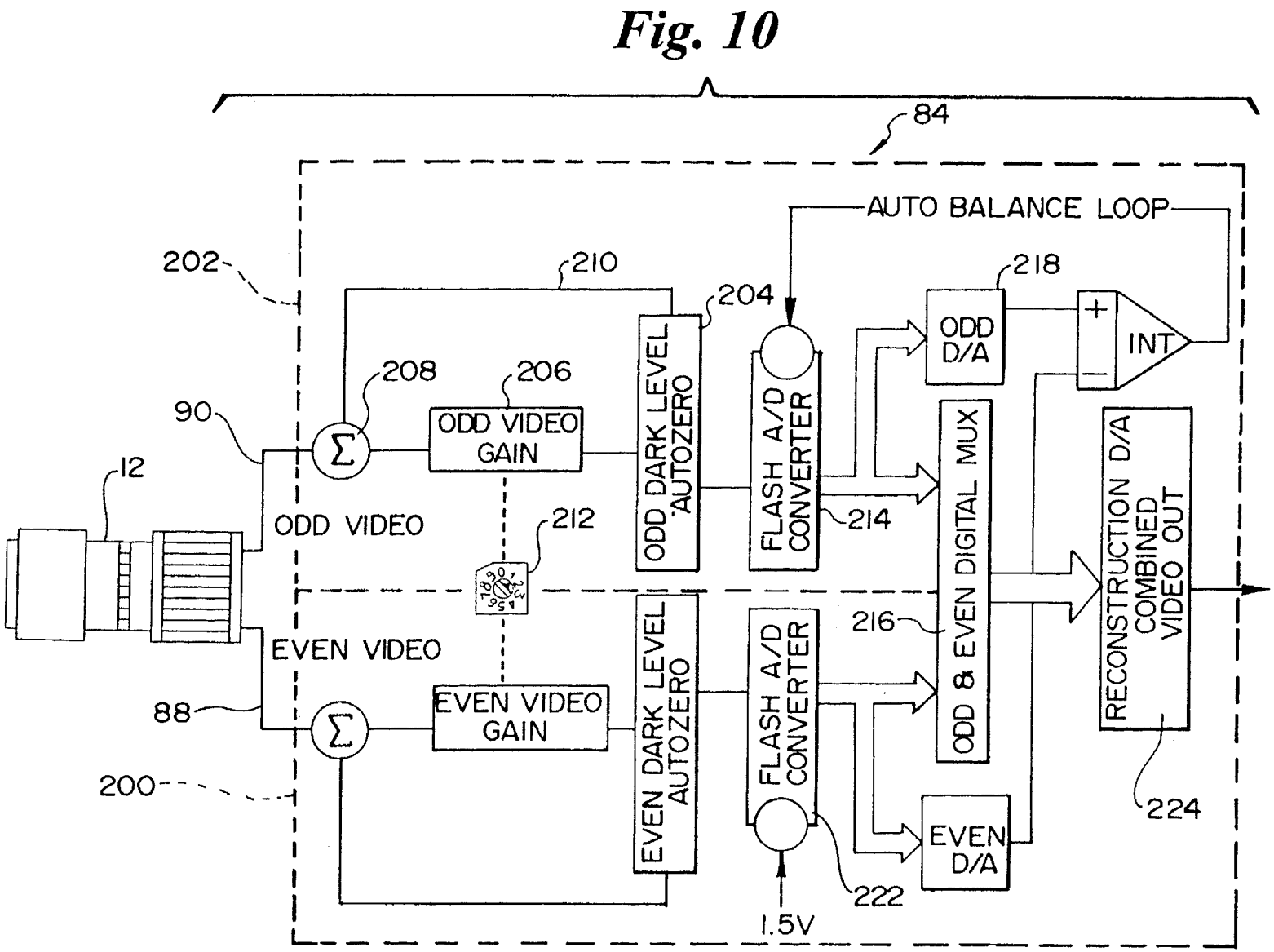
FIG. 10 is a more detailed block diagram showing a preferred embodiment of the preprocessing circuit of the present invention.

Referring now to FIG. 10, a more detailed block diagram of preprocessing circuit 74 is shown. Generally, preprocessing circuit 84 is comprised of two mirror image portions, even processing circuit 200 for processing even pixel signal 88 and odd processing circuit 202 for processing odd pixel signal 90, both of which operate in substantially the same manner. For simplicity, only the odd processing circuit 202 will be described. For the Reticon line scan camera 32 of the preferred embodiment, the first 11 photosites 10 are masked and are used by preprocessing circuit 84 to establish a dark level reference. Two of these masked pixels are sampled with a sample window of 50 ns at the beginning of each camera scan by dark level auto-zero circuit 204. This sampled value is then used to develop an error signal that will be subtracted from the odd pixel signal 90 by auto-zero circuit 204, thereby driving the DC offset dark voltage to zero volts. Because auto-zero circuit 204 is located after video gain has been applied to odd pixel signal 90 by gain amplifier 206, any amplifier induced offset voltages are within the auto-zero feedback loop.

Any non-zero voltage that exists for the masked and sampled pixels at the sample time is integrated by integrator 208 to produce a zero error term in the sampled and masked pixel values of odd pixel signal 90. This is accomplished by providing feedback signal 210 from auto-zero circuit 204 which is out of phase with and added to the sampled, masked pixel values of odd pixel signal 90. In this way, auto-zero circuit 204 continuously forces the masked pixel values within scan array 12 that are being used to represent a dark level to a zero voltage value. As a result, the remaining non-masked pixel values in odd pixel signal 90 will now vary with respect to zero volts, rather than some dark level offset voltage. A user-adjustable switch 212 is also provided for manually adjusting the gain of amplifier 206.

A video flash A/D converter 214 converts the odd pixel signal 90 with respect to zero volts. The digital output of A/D converter 214 represents an 8-bit digital value of the odd video as it changes with incident light. The even video signal is zeroed and converted in the same manner. The digital output of A/D converter 214 is supplied both to and odd/even digital mux 216 and odd D/A converter 218. The odd D/A converter 218 contains circuitry for averaging the odd pixel values of all of the photosites 10 for scan array 12. This average odd pixel value is then supplied, along with a similar average even pixel value to inputs of a differential integrator 220 which produces a feedback control signal for controlling the voltage level used by A/D converter 214. In this way, an even A/D converter 222 can used a fixed voltage reference level, and odd A/D converter 214 can now use a varying voltage level that is corrected by the output of integrator 220 to remain in balance with the even A/D converter 222.

Interpixel glitch is eliminated by the combination of odd/even digital mux 216. The odd and even digital outputs of the A/D converters are multiplexed to form a contiguous stream of video data: odd 1, even 2, odd 3, even 4, odd 5, etc. The combined digital data stream is applied to reconstruction D/A 224 that generates filtered video output signal 82.

Figure 11:
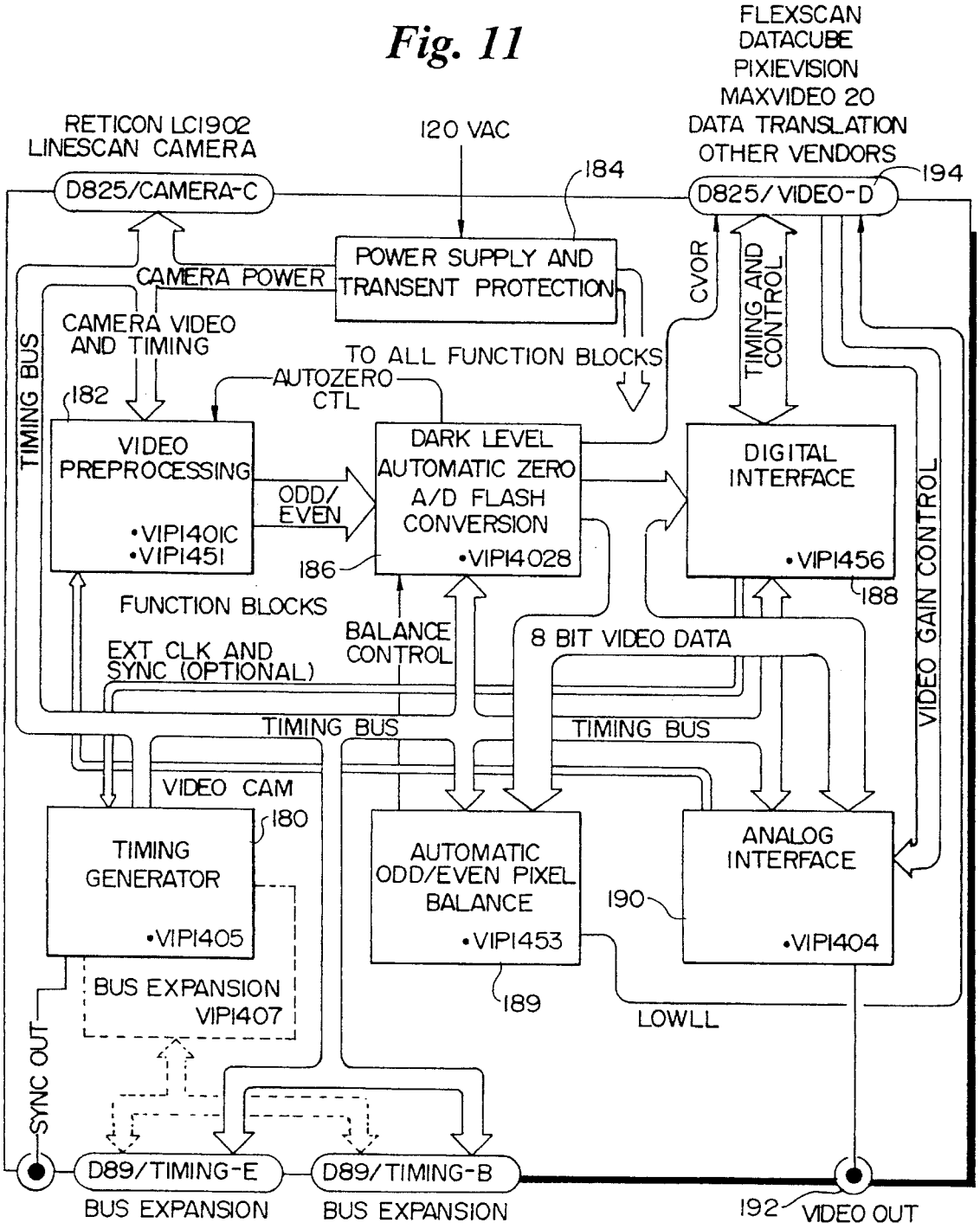
FIG. 11 is a simplified flow diagram for data flow in the preprocessing circuit shown in FIG. 10.

FIG. 11 is a simplified flow diagram of preprocessing circuit 84. In the preferred embodiment, the various functional units shown in FIG. 11 are implemented as separate circuit cards mounted on a common mother board and interconnected via various data paths, as well as being connected to various external ports for connection to the camera outputs and the post processing inputs, for example. The functional unit of preprocessing circuit 84 include a timing generator 180 for generating all of the timing signals required by the circuit and a power supply circuit 182 for supply all power signals to the other functional units. Video preprocessor 84 include the video gain 206 and the integrator 208 portion of the auto-zero circuit. Dark level auto-zero and A/D flash conversion circuit 186 include the dark level auto-zero circuit 204 and the flash A/D converter 214. An 8-bit digital video data bus 216 connects video converter circuit 186 with digital interface circuit 188, which includes digital mux 216. Auto-balance circuit 189 includes odd D/A 218, even D/A 220 and differential integrator 222. Finally, analog interface circuit 190 includes reconstruction D/A 224. Filtered video output signal 82 is supplied at video out port 192. Alternatively, a digital version of filtered video output signal 82 may be supplied via digital interface 188 to digital connector port 194.

Figure 12:
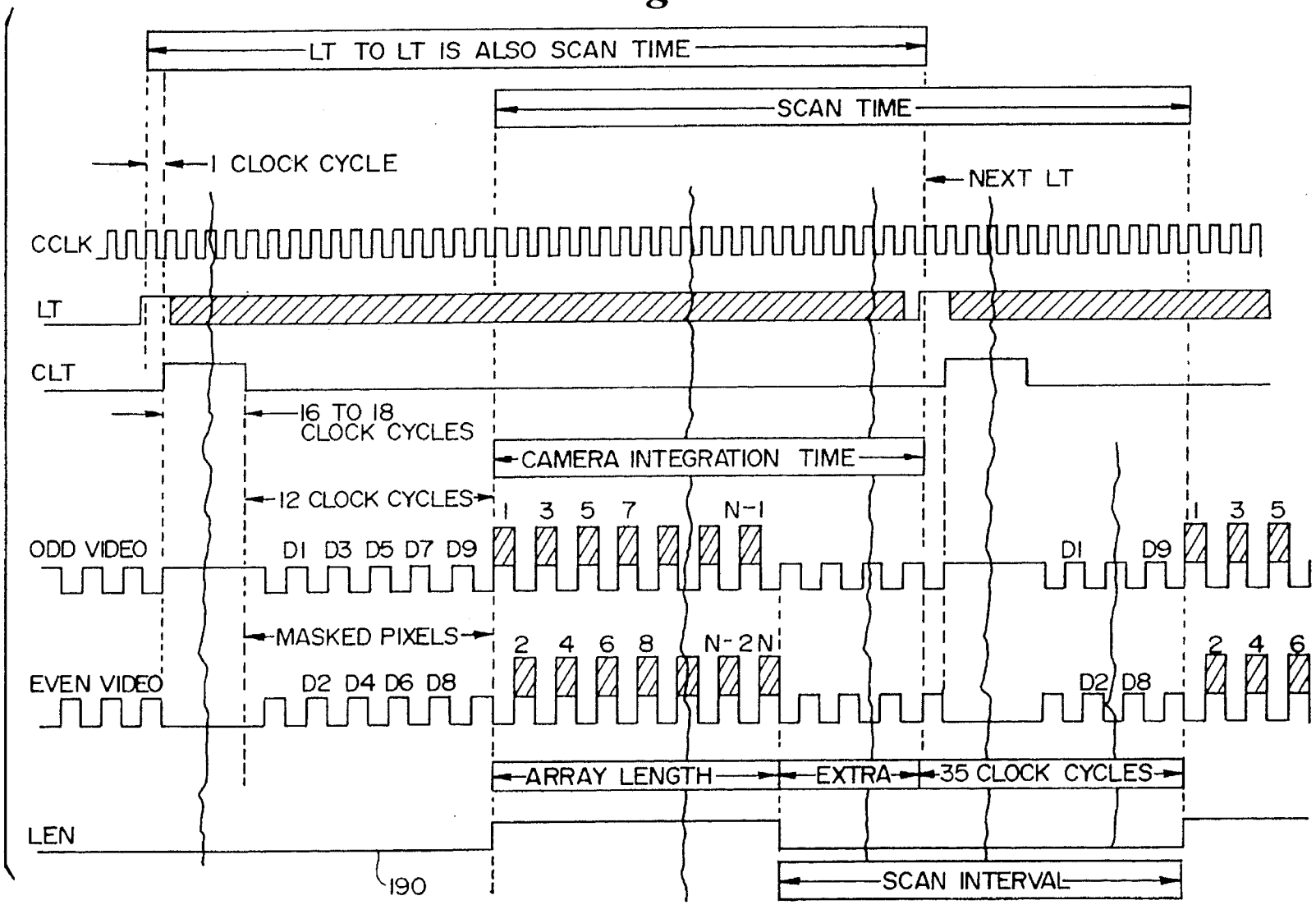
FIG. 12 is a simplified timing diagram of the camera signals of the line scan camera of the preferred embodiment.

Referring now to FIG. 12, a simplified timing diagram of the camera signals of the Reticon LC1902 line scan camera of the preferred embodiment is shown. At the beginning of each scan, the charge transferring and resetting takes place as part of a "housekeeping" requirement of the line scan camera. Together, the time required for the housekeeping, plus the number of photosites 10 will determine the number of clock cycles required for each scan. For the LC1902 camera of the preferred embodiment, housekeeping requirement is 35 clock cycles. Thus, the minimum number of clock cycles for a camera scan is the array length +35.

The start of each scan is indicated after the rising edge of the LT signal. The housekeeping includes a clock frequency dependent reset time of 16 to 18 pixel clock cycles as determined by the CLT signal. The CLT signal is internally generated by the line scan camera after the camera has received an LT input from timing generator 180 in preprocessing circuit 84. The LT signal is an input to line scan camera 32 that transfer the charge from each photosite 10 to readout registers 20, which in turn transfer the charge to the odd and even video output ports of the camera. It will be understood that the LT signal has very specific requirements as defined by the particulars of the circuitry for scan array 12 within line scan camera 32. The CCLK signal is a replicated version of a master clock input signal which is supplied to line scan camera 32 and which determines the scan rate for the camera. The CCLK signal may be used to resynchronize the video signals and remove the effect of cable propagation delay. In this embodiment, the first 11 pixels are masked, thus the masked period shown at 190 is a constant 12 clock cycles.

Preprocessing circuit 84 receives the terminated even pixel signal 88 and odd video pixel signal 90 from line scan camera 32. The first 11 pixels of the array are physically masked by the manufacturer of the line scan camera to provide a sample region to obtain the dark level offset voltage. Auto-zero circuit samples the dark level offset of two masked odd pixels and averages the result to obtain the voltage that will be used for the odd auto zero correction circuitry. Likewise, two even pixels are sampled for the even auto zero correction. In both cases, pixels near the center of the masked region are used for a more accurate sample value. The dark level offset voltage at the beginning of the mask tends to be slightly low while the voltage near the end of the mask tends to be high due to the fact that the mask can leak a little.

The odd and even dark level offsets are individually tracked and corrected with a closed loop operation that assures a dark level offset below 1 LSB (6 mV). Zero offset is maintained under all conditions of operation including changing the clock frequency or f-stop settings or offset drift of the line scan camera. In the case of the preferred embodiment, the manufacturer specifies the Reticon LC1902 dark level drift is 5 mV/C.

For the reasons previously discussed, it is essential that the pixel dark levels be at zero volts if the full capability of a vision system is to be realized. The measure of the true video signal amplitude is with respect to the pixel dark level. Any significant dark level offset will cause an offset voltage and video signal interdependency that will lead to application measurement errors. Significant offset is defined as any voltage greater than 3 LSB (18 mV) of the flash video converter.

Figure 13:
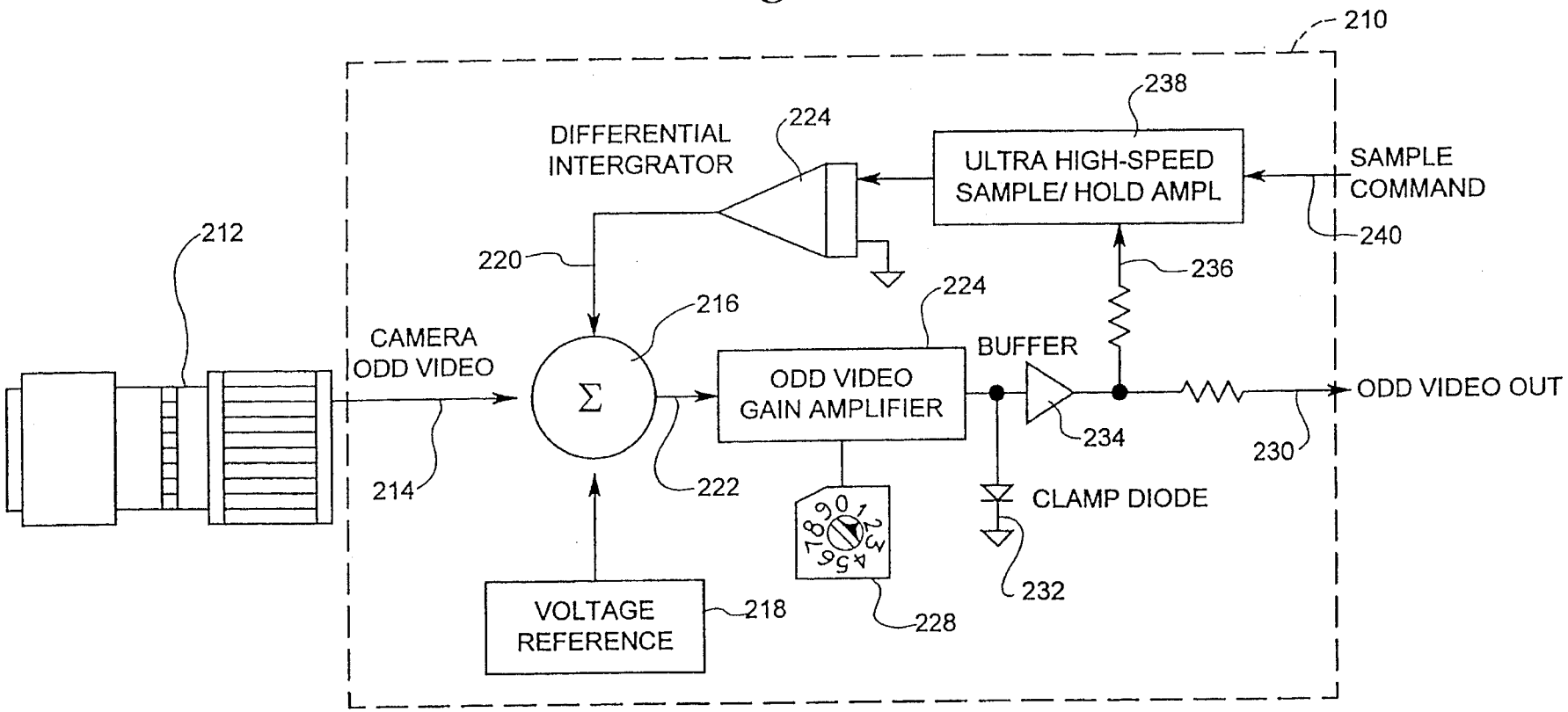
FIG. 13 is a more detailed block diagram of a preferred embodiment of the auto-zero portion of the preprocessing circuit shown in FIG. 10.

Referring now to FIG. 13, the specific operation of a preferred embodiment of the auto-zero portion of preprocessing circuit 84 will be described in further detail. For an even more detailed discussion of the auto-zero portion of preprocessing circuit 84, reference is made to the previously identified co-pending application entitled "Automatic Dark Level Zeroing For A CCD Camera".

Auto-zero circuit 210 is DC-coupled to a CCD camera 212 and receives a raw video signal 214 from CCD camera 212. Three signals enter a summing node 216 of auto-zero circuit 210: raw video output signal 214, a fixed reference voltage 218 and a zero correction signal 220. As indicated in the background section, raw video output signal 214 rides on a DC bias offset that varies with temperature, pixel clock frequency, and ambient conditions, and from camera to camera. In a preferred embodiment in which line scan camera is a Reticon LC1902 line scan camera, the nominal value of the DC bias offset is −3.6 volts. Consequently, fixed reference voltage 218 is chosen at +3.6 volts so as to bring the output 222 of summing node 216 to a value that should be close to zero volts, except for the variations as described above. It will be understood, however, that while the use of fixed reference voltage 218 allows for operation of the circuit components of auto-zero circuit 210 in a more optimum range, there is nothing in the present invention which requires fixed reference voltage 218 to be added at summing node 216. The primary advantage of using fixed reference voltage 218 is that a difference integrator 224 is permitted to operate in the center of its dynamic range.

A video gain amplifier 226 receives output 222 from summing node 216 and is included within the adaptive feedback loop formed by auto-zero circuit 210. In this way, amplified offset voltages of gain amplifier 226 are corrected at the same time as the dark level DC bias offset voltages. In a preferred embodiment, a switch 228 controls the gain of gain amplifier 226 in response to a user-supplied setting. By including a gain amplifier within the adaptive feedback loop, a filtered video output signal 230 can be adjusted to a level that optimizes, for example, a flash analog-to-digital (A/D) conversion which is part of the next stage of a preferred embodiment of a preprocessing circuit incorporating the present invention.

A high speed Schottky diode 232 is used to clamp the portion of video signal 214 that does not contain useful information. Without this clamp, a buffer amplifier 234 and any subsequent video amplifiers ?? (FIG. 5) would saturate and would have-to recover before valid video could be passed through. It will be noted that valid video is always the opposite polarity from the clamped portion of video signal 214.

An output 236 of buffer amplifier 234 is sampled by a wide range, bipolar, ultra high speed sample/hold circuit 238. A sample command 240 is provided by an external processor (not shown) or timing generator (not shown) based on the timing of a desired sample pixel in video signal 214 which is representative of a dark level reference within CCD camera 212. It is preferable that sample/hold circuit 238 have a very large capture range as the polarity and value of an initial DC bias offset will not be known.

An output 242 of sample/hold circuit 238 representative of the sampled voltage is delivered to difference integrator 224 where output 242 is subtracted from 0 volts (ground). The result of this operation is that an error signal, referred to as zero correction signal 220, that is applied to summing node 216. The high open loop gain of difference integrator 224 attempts to drive output 242 to a 0 volt difference at the differential inputs of difference integrator 224. because one of the inputs is at ground, the resultant zero correction signal 220 drives output 222 representing the valid information in video signal 214 to a dark level bias of 0 volts. In this case, the only uncorrected offset terms are an amplifier offsets in difference integrator 224 and buffer amplifier 234.

In order to obtain a pixel signal from which to sample the dark level voltage, a certain number of pixel photosites within the scan array (not shown) of CCD camera 212 are physically masked by the manufacturer of the line scan camera to provide a sample region from which a dark level offset voltage may be obtained. In a preferred embodiment, the first 11 pixel photosites are masked and auto-zero circuit 210 samples the dark level offset of two masked odd pixels and averages the result to obtain the voltage that will be used to produce an error signal for an adaptive feedback loop. Preferably, pixels near the center of the masked region are used for a more accurate sample value because the dark level offset voltage at the beginning of the mask tends to be slightly low while the voltage near the end of-the mask tends to be high due to the fact that the mask can leak a little.

Video gain amplifier 226 is located within auto-zero loop 210 so that any amplifier offset that might be introduced is automatically zeroed out. Setting the correct video gain is very important in order to achieve maximum signal to noise ratio in the resultant video output signal 230. Ideally, the video gain setting should provide a 100% signal at the maximum level of the A/D flash converters which are used in the auto-balance circuit of the present invention where the odd and even pixel streams are combined into a single video output signal.

After auto-zeroing, video amplification can be applied. The number of video selections for the standard video preprocessor is seven. The video gain amplifiers are located within the auto-zero loop thus any amplifier offset that might be introduced is automatically zeroed out. Setting the correct video gain is very important in order to achieve maximum signal to noise ratio in the resultant video output signal. Ideally, the video gain setting should provide a 100% signal at the maximum level of the A/D flash converters which are used in the next stage of preprocessing circuit 84 where the odd and even pixel streams are combined into a single video output signal.

In a preferred embodiment, preprocessing circuit 84 uses two 8 bit flash converters in the pixel combining process. The full scale reference voltage for the even converter is fixed at 1.50V. The voltage reference for the odd converter is 1.5V±0.5V. The odd reference is varied during pixel balancing so that the output code of the odd converter agrees with the output of the even converter. Any converter always produces an output code with respect to its' conversion voltage reference thus the approximate value of an LSB is 6 mV (1.50V÷256=5.86 mV).

Although a vision system may be specified as having 256 gray levels, it should be understood that this level of resolution is only with respect to full scale voltage. If the voltage into the A/D flash converter is less than full scale, say 600 mV, the resolution has decreased to 100 gray levels since the LSB value does not change. At lower light levels, the LSB value becomes a larger and larger percentage of the signal and amplitude indeterminacy will become significant. Adding post flash video gain cannot improve this situation. Once the video signal is digitized, the signal to noise ratio of the system is set, although it can get worse. Unless, of course, some post processing filtering or pixel averaging is used which limits system performance in another way. As a result, in order to maintain the best possible signal to noise, a pre-flash video gain is utilized by the auto-zero circuit. The video signal into the flash converters should always be as large as possible. The video gain is set to a value so that converter overrange does not occur when the camera is viewing the maximum light condition including expected defect signals. Because of the importance of this procedure, both a overrange LED indicator and an overrange status line are provided in the preferred embodiment.

In addition to the pre-flash video gain, it should also be recognized that the f-stop of a camera lens is, in actuality, another gain control for the overall system. Each click on the f-stop ring on the line scan camera doubles or halves the amount of light reaching the camera. Thus, it is possible to use the lens f-stop in conjunction with the video gain control to maximize the signal into the converter. When possible, the lens f-stop should be opened as far as possible, depth of field permitting. If the converter does not overrange, additional gain should be added with the video gain control so that the converter will be just below the overrange point with maximum light into the camera. If, even with the minimum video gain setting, which is the default value, the converter overranges, the lens f-stop should then be closed down until no overrange occurs.

The odd and even flash converters convert with respect to 0 volts. The full scale range (all bits='1') is set by the reference input voltage and must be between 1.0 volts and 2.1 volts. The even flash converter has a fixed reference for a full scale range of 1.50 volts. Thus, an LSB is approximately 6 mV (LSB=1.50V 256=5.86 mV). The odd flash converter has a variable reference that is used by the Balance function to change the gain of this converter. When both converters have the same average digital output code, the odd and even pixels are balanced. A converter overrange is indicated when the input analog voltage exceeds the converter reference voltage on any given pixel. The overrange output from the odd and even converter are OR'ed together and pulse stretched to 21 mS before driving the overrange LED.

Figure 14:
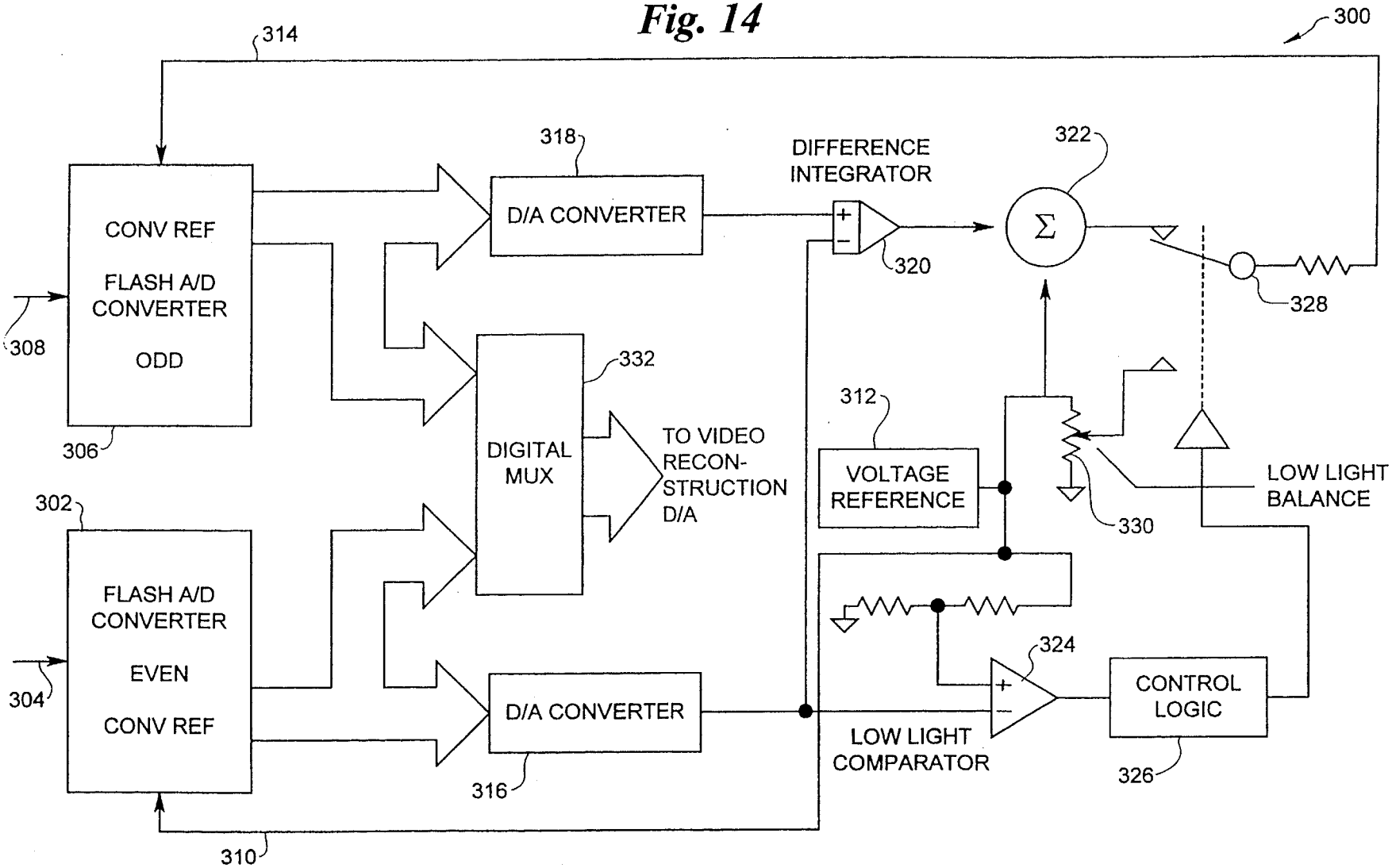
FIG. 14 is a more detailed block diagram of a preferred embodiment of the auto-balance portion of the preprocessing circuit shown in FIG. 10.
Figure 15:
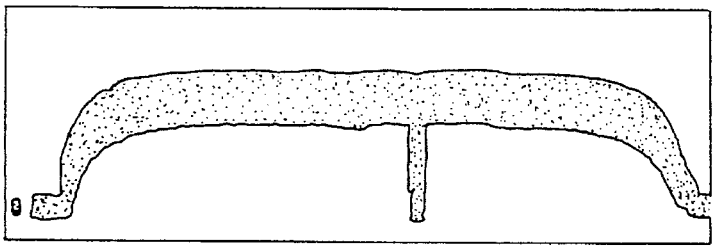
FIG. 15 is a pictorial representation of an oscilloscope trace of a filtered video output signal from a prior art web inspection system showing a negative-going defect.

Referring now to FIG. 14, the specific operation of a preferred embodiment of the auto-balance portion of preprocessing circuit 84 will be described in further detail. For an even more detailed discussion of the auto-balance portion of preprocessing circuit 84, reference is made to the previously identified co-pending application entitled "Automatic Pixel Balance Circuit For A CCD Camera".

A first flash A/D converter 302 is provided with an even pixel video stream 304 and a second flash A/D converter 306 is provided with an odd pixel video stream 308. In a preferred embodiment, pixel video streams 304 and 308 each have had a dark level offset removed. A preferred DC-coupled automatic zeroing circuit is described in connection with the description of FIG. 7. Alternatively, the dark level offset of pixel video streams 304 and 308 could be removed by an AC-coupled DC restoration circuit.

In the preferred embodiment a conversion reference 310 for even A/D converter 302 is supplied by a voltage reference 312 that is fixed as 1.5 volts which is midway in the specified conversion range of 1.0 to 2.1 volts. A conversion reference 314 for odd A/D converter 306 is variable and is determined by the balance circuit 300.

An 8-bit digital output of even flash A/D converter 302 is fed to a D/A converter 316. The 8-bit digital output of odd flash A/D converter 306 is fed to a D/A converter 318. Both D/A converters 316 and 318 are preferably chosen to have a slower conversion rate than A/D converters 302 and 306. In a preferred embodiment, the conversion rate of D/A converters 316 and 318 is about 10 times slower than the conversion rate of A/D converters 302 and 306. By doing so, this provides some initial filtering of the analog pixel values. The outputs of each of the D/A converters 316 and 318 are fed to a difference integrator 320 which has a time constant (tau) that is greater than at least two camera scan times and preferably is about 1 second. As a result, difference integrator 320 provides a running average of a comparison between the average even pixel value and the average odd pixel value for each camera scan time.

The action of difference integrator 320 is to drive the difference between its tow inputs to zero volts. The odd and even pixel voltages which are supplied to difference integrator 320 represent the voltage levels of active pixel. When the CCD camera sees a defect or variance in its field of vision, the even and odd pixel video streams will contain a number of even and odd pixels that sense the defect, for example. If the number of even and odd pixels which sense the defect, as opposed to sensing a normal background signal, is equal the output of difference integrator 320 will be unchanged, even thought the absolute value of the scan average for both the odd and even pixel video signals has changed. If the defect has a different number of odd and even pixels (for example, a defect is 11 pixels wide resulting in a 5 odd pixels and 6 even pixels seeing a changed value), the output of difference integrator 320 is still essentially unchanged because a 1 pixel difference in a 256 pixel camera array would be a difference of only 0.4%, while a 1 pixel difference in a 2048 pixel camera array would be a difference of only 0.05%. Thus, the scan-wide average will represent the actual average pixel imbalance between the even and odd pixels video signals, even in the presence of a defect or other variance being sensed by the CCD camera.

In a preferred embodiment, the output of difference integrtor 320 is fed to a summing node 322 which also is connected to voltage reference 312. The purpose for providing fixed voltage reference 312 to summing node 322 is to place the nominal operation of difference integrator 320 near the venter of its dynamic range. With a normal light level, the output from summing node 322 is supplied as variable reference voltage 314 for odd flash A/D converter 306. A digital mux 332 which is used to multiplex the even and odd pixel signals that is sent to a reconstruction D/A converter (not shown) to provide a glitch free, filtered and balanced analog video output signal.

In a preferred embodiment, a low light comparator 324 checks to see if the output of even D/A converter 316 is below a predefined percentage of the full scale value from D/A converter 316. In the preferred embodiment, a value of 8% is used. Control logic 326 checks to insure that if low light comparator 324 detects a low light level that this low light level is actually a valid low light level and not just a momentary defect or variance in the viewed image. If a valid low light level is detected and confirmed, a switch 328 switches off the output of summing node 322 and switches on the output of a trim pot 324 that would manually correct any pixel imbalance in a low light condition. This is necessary to prevent an unstable loop condition which would otherwise occur in a 0 minus 0 situation (if both the odd and even pixel video signals are 0 or near 0 due to the low light level condition).

Even though the odd pixels and even pixels receive the same light, the odd and even video outputs will not have the same voltage amplitude. Sensitivity differences between odd and even pixels, slight differences between the propagation delays of the odd and even video amplifiers and slight differences between the odd and even flash conversion points are the major factors causing pixel imbalance. Changes in pixel clock frequency, the f-stop of the camera lens and video gain setting also affect pixel balance. Ideally, the odd and even pixels should have the same voltage level when receiving the same light regardless of these factors. It is not uncommon that the f-stop or pixel clock frequency is changed, especially during a feasibility study or investigation. Ultimately, any difference between the odd and even voltage levels will limit the time resolution of the array. If an odd and even pixel must be averaged to reduce the video noise, single pixel resolution cannot be achieved.

Pixel imbalance exists when there is a difference in the odd and even pixel voltage levels although all pixels are receiving the same light. The balance correction is global and is applied to all of the active pixels, however, no correction is applied to any masked dark level pixels. Pixel to pixel imbalance due to PRNU is not corrected by the auto balance circuits. PRNU is the Photo Response Non-uniformity of the camera array. This is specified by the camera manufacturer. PRNU is typically measured with uniform illumination at approximately 50% saturation with the first and last pixels ignored. In general, auto balance is unaffected by objects within the field of view of the camera.

Pixel balance is accomplished by adjusting the reference voltage of the odd flash converter to make the average digital output code identical to that of the even flash converter. The odd reference voltage may be adjusted manually by a trim pot or the balance function may be fully automated by using the auto-balance circuit 410. Auto-balance circuit 410 generates a balance correction voltage that is fed to the video converter 412 to correct odd and even pixel imbalance. The balance correction voltage is achieved by subtracting the odd pixel analog voltage level from the even pixel analog voltage level. The difference voltage is applied to a high gain error amplifier to develop the balance correction voltage. This correction voltage is then averaged (tau=1 second) and becomes the error signal in a closed loop operation that forces the odd and even pixel difference to zero volts.

Because the auto-balance function is a closed loop operation, an error signal (i.e., a small non-zero difference between odd and even pixel levels) is required to maintain loop stability. When the camera receives no light, all pixels will be zero volts and there is no difference voltage, even though an imbalance would exist if there were light. A "no light" condition might be a lens cap in place, an object in front of the camera lens or anything temporary blocking the light during the normal use of the system.

In the preferred embodiment, when 64 consecutive pixels drop below 8% of the nominal full scale output of the even flash converter, the auto balance function is switched into a low light level mode. An 8% video level corresponds to a gray level of about 20 out of 256 or about 120 mV out of a full scale of 1.50V. In low light level operation, the gain of the error amplifier is switched to unity and the LOW LEVEL BALANCE mode becomes active. An LED indicates low light level operation. At the time auto balance circuit 410 switches to low light level, the closed loop operation of auto balance is broken and a "fixed" balance correction voltage is supplied by a low level trim pot on the Auto Balance board. This pot must be calibrated by creating the low light level necessary for a desired optimum balance.

It may not be possible to achieve perfect balance across the entire array when the light intensity across the array varies greatly, for example, high in the center and quite low at the edges. This is generally due to a slight difference between the odd and even pixel gain linearity. If good balance is achieved for the center pixels, balance may suffer at the edges and vice versa. This is true whether auto balance or manual balance is being used. The auto balance circuits will take the majority case, i.e., when most of the pixels are receiving high light intensity, the auto balance circuit will optimize these pixels even if the pixels at low light level suffer.

Pixel balance for dark detection fields is different. While all of the same principles concerning balance still apply, the normal dark field video shows no imbalance since there is no video signal to begin with. It is only during the defect signal that an imbalance could be seen. In this case, a manual balance is selected and the balance is then optimized for a typical defect signal. It is important that this balance procedure be done if single pixel resolution is required. If the odd and even pixel do not have the same sensitivity, a defect hole over an odd pixel produces a different signal amplitude than the same hole over an even pixel. In one case, the defect may trip an amplitude threshold but not in the other.

Figure 16:
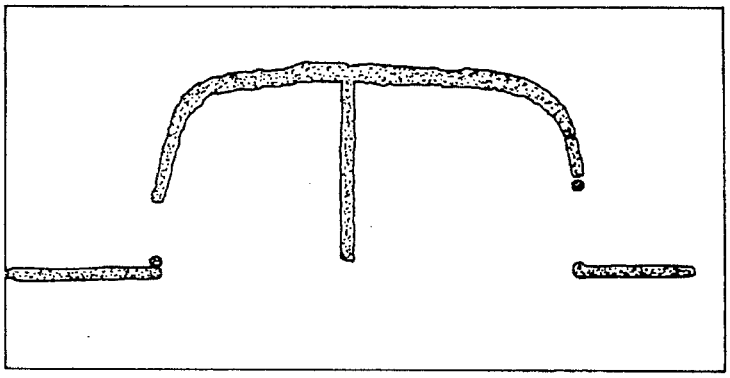
FIG. 16 is a pictorial representation of an oscilloscope trace of a filtered video output signal from the present invention showing the same negative-going defect as shown in FIG. 15.
Figure 17:
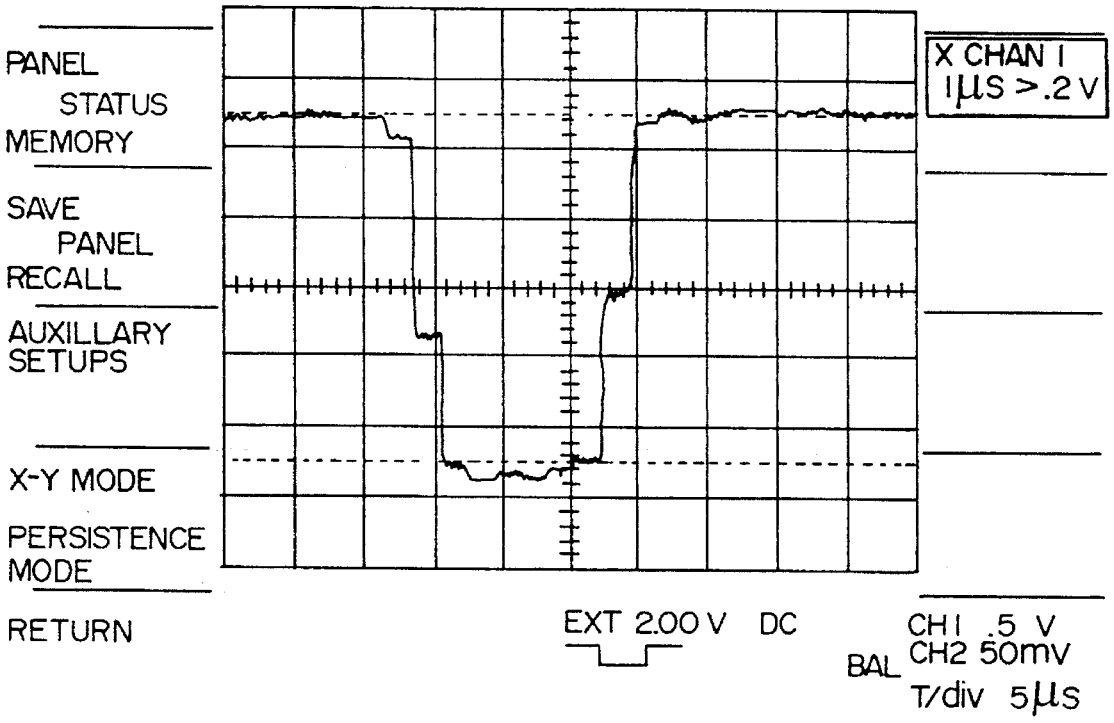
FIG. 17 is an expanded version of the oscilloscope trace of FIG. 16.

Referring now to FIGS. 16, 17 and 18, a comparison is made on the impact on signal-to-noise ratio (S/N ratio) and defect detectability of the preprocessing circuitry of the present invention as compared to the prior art. FIG. 16 is a pictorial representation of an oscilloscope trace of a filtered video output signal from a prior art web inspection system showing a negative-going defect 900. FIG. 17 is a pictorial representation of an oscilloscope trace of a negative-going defect 902 as detected by the preprocessing circuitry of the present invention under identical operating conditions and lighting conditions for an identical size defect. In each case, the "thickness" or width of defect 900 and 902 is representative of the noise produced by the system. In the case of the prior art system, the thickness of defect 900 is about 375 mV peak out of a total pedestal value of 1.5 V, giving a S/N ratio of 25%. In the case of the present invention, the thickness of defect 902 is less than about 15 mV peak out of a total pedestal value of 600 mV, giving a S/N ratio of less than 2.5%. FIG. 18 shows the oscilloscope trace of FIG. 17 expanded near defect 902. In this trace, there is no interpixel glitch and there is only a very minor amount of residual pixel imbalance which appears at the base of defect 902 and near the top where defect 902 merges into the pedestal.

In the case of the particular prior art system shown in FIG. 16, about 70% of the noise in the defect signal is attributable to interpixel glitch and the remaining 30% is attributable to pixel imbalance. In other prior art systems which have been tested, the S/N ratio varies from as low as 6% for the internal preprocessing circuitry of the manufacturer of the line scan camera of the preferred embodiment, to as high as the 25% shown in FIG. 16. In the case of the 6% S/N ratio value, 45% was attributable to pixel imbalance and 55% was attributable to interpixel glitch. In no case, however, was the S/N ratio of the preprocessing circuitry less than about 5% or less than the inherent S/N ratio of the scan array of the line scan camera. By having a S/N ratio of less than 2.5% for the preprocessing circuitry of the present invention, the present invention significantly improves upon the performance of prior art systems. More importantly, the preprocessing circuitry of the present invention does not introduce additional error into the video signal, thus the defect detectability and resolution of the web inspection systems is a function of the inherent S/N ratio of the line scan camera, and not of the preprocessing circuitry.

I claim:

1. A web inspection system for inspecting a moving web for defects comprising:

a charge-coupled device (CCD) camera that uses a scan array comprised of a plurality of pixel photosites to produce an analog raw video signal representative of the moving web, the raw video signal including a sync pulse for each scan period and having an inherent maximum signal-to-noise (S/N) ratio for a pixel resolution of the raw video signal during each scan period;

a preprocessing circuit operatively coupled to the CCD camera to receive the raw video signal and generate an analog filtered video signal for each scan period that has a preprocessing maximum S/N ratio at the pixel resolution of the raw video signal that is no greater than the inherent maximum S/N ratio of the raw video signal; and a post processing system operatively coupled to the preprocessing circuit to receive the filtered video signal and evaluate the filtered video signal to detect video signals representative of defects in the moving web that are as small as a scan area in the moving web that is scanned by a single one of the plurality of pixel photosites.

2. The web inspection system of claim 1 wherein the maximum preprocessing S/N ratio of the analog filtered video signal as compared to the raw video signal is less than 5%.

3. The web inspection system of claim 1 wherein the maximum preprocessing S/N ratio of the analog filtered video signal as compared to the raw video signal is less than 2.5%.

4. The web inspection system of claim 1 wherein the scan area is less than 40.32 $mm^2$ (0.0625 $in^2$) and the consistency of the web inspection system is less than one pixel variance/billion pixels scanned.

5. The web inspection system of claim 4 wherein the scan area is less than 1 $mm^2$ (0.0016 $in^2$) and the consistency of the web inspection system is less than one pixel variance/twenty five billion pixels scanned.

6. The web inspection system of claim 1 wherein the moving web comprises generally planar material which has a velocity relative to the CCD camera, the planar material being, selected from the group consisting of a substantially continuous web of rolled material or a series of discontinuous sheets of flat material.

7. The web inspection system of claim I wherein the CCD camera is selected from a group consisting of an area scan camera and a line scan camera.

8. A web inspection system for inspecting a moving web for defects comprising:

a charge-coupled device (CCD) camera that uses a scan array comprised of a plurality of pixel photosites to produce an analog raw video signal representative of the moving web, the raw video signal including a sync pulse for each scan period;

a preprocessing circuit DC-coupled to the CCD camera to receive the raw video signal and generate an analog filtered video signal for each scan period using an adaptive feedback loop that preserves a fidelity of the raw video signal in generating the filtered video signal; and a post processing system operatively coupled to the preprocessing circuit to receive the filtered video signal and evaluate the filtered video signal for the existence of video signals representative of defects in the moving web, such that the web inspection system provides for consistent detection of defects in the moving web.

9. The web inspection system of claim 8 wherein at least one pixel photosite is internally masked within the CCD camera and the adaptive feedback loop utilizes a portion of the raw video signal corresponding to the at least one pixel photosite that is internally masked to remove a dark level DC offset in the raw video signal.

10. The web inspection system of claim 9 wherein the adaptive feedback loop comprises:

a summing node that receives the raw video signal and combines an error signal with the raw video signal to produce a zeroed video signal;

means for sampling selected portions of the zeroed video signal corresponding to the least one pixel photosite that is internally masked; and a difference integrator that compares the selected portion of the zeroed video signal with a zero voltage reference to produce the error signal.

11. The web inspection system of claim 10 wherein the moving web comprises generally planar pieces of material which have a velocity relative to the CCD camera, the planar pieces of material being selected from the group consisting of a substantially continuous web of rolled material or a series of discontinuous sheets of flat material and wherein the CCD camera is selected from a group consisting of an area scan camera and a line scan camera.

12. The web inspection system of claim 8 wherein the preprocessing circuit includes a video gain circuit within the adaptive feedback loop.

13. The web inspection system of claim 8 wherein the raw video is comprised of an even pixel video signal and an odd pixel video stream and wherein the preprocessing circuit includes a pair of adaptive feedback loops, a first adaptive feedback loop to process the even pixel video signal and generate a corrected even pixel video signal and a second adaptive feedback loop to process the odd pixel video signal and generate a corrected odd pixel video signal.

14. The web inspection system of claim 8 wherein the raw video is comprised of an even pixel video signal and an odd pixel video stream and wherein the preprocessing circuit further comprises:

an automatic pixel balancing circuit that balances the even pixel video signal with the odd pixel video signal.

15. The web inspection system of claim 14 wherein the automatic pixel balancing circuit comprises:

a first analog-to digital (A/D) converter for converting the even pixel video signal to a digital sequence of even pixel values using a fixed reference voltage value;

a second analog-to digital (A/D) converter for converting the odd pixel video signal to a digital sequence of odd pixel values using a variable reference voltage value;

a first digital-to-analog (D/A) converter for converting the digital sequence of even pixel values to an even feedback signal;

a second digital-to-analog (D/A) converter for converting the digital sequence of odd pixel values to an odd feedback signal; and a difference integrator circuit that compares the odd feedback signal to the even feedback signal and generates the variable reference voltage.

16. The web inspection system of claim 8 wherein the raw video is comprised of an even pixel video signal and an odd pixel video stream and wherein the preprocessing circuit further comprises:

a pixel recombining circuit for multiplexing the even pixel video signal and the odd pixel video signal to generate the filtered video signal.

17. The web inspection system of claim 16 wherein the pixel recombining circuit includes:

a first analog-to digital (A/D) converter for converting the even pixel video signal to a digital sequence of even pixel values a second analog-to digital (A/D) converter for converting the odd pixel video signal to a digital sequence of odd pixel values;

a multiplexer for sequentially combining the digital sequence of even pixel values with the digital sequence of odd pixel values to produce a digital sequence of even and odd pixel values; and a digital-to-analog (D/A) converter for converting the digital sequence of even and odd pixel values to the analog filtered video signal.

18. The web inspection system of claim 8 wherein the raw video is comprised of an even pixel video signal and an odd pixel video stream and at least one pixel photosite for the even pixel video signal and one pixel photosite for the odd pixel video signal is internally masked within the CCD camera and wherein the preprocessing circuit comprises:

a pair of separate adaptive feedback loops, a first adaptive feedback loop to process the even pixel video signal and a second adaptive feedback loop to process the odd pixel video signal, each adaptive feedback loop utilizing a portion of the raw video signal corresponding to the at least one pixel photosite that is internally masked to remove a dark level DC offset in the raw video signal and generate a zeroed video signal;

an automatic pixel balancing circuit that balances a zeroed even pixel video signal with a zeroed odd pixel video signal to generate a balanced even pixel video signal and a balanced odd pixel video signal; and a pixel recombining circuit for multiplexing the balanced even pixel video signal and the balanced odd pixel video signal to generate the filtered video signal.

19. The web inspection system of claim 18, wherein:

each adaptive feedback loop includes:

a summing node that receives the raw video signal and combines an error signal with the raw video signal to produce a zeroed video signal;

a video gain circuit that selectively amplifies the zeroed video signal to produce an amplified and zeroed video signal;

means for sampling selected portions of the amplified and zeroed video signal corresponding to the at least one pixel photosite that is internally masked; and a difference integrator that compares the selected portion of the amplified and zeroed video signal with a zero voltage reference to produce the error signal;

the automatic pixel balancing circuit comprises:

a first analog-to digital (A/D) converter for converting a zeroed and amplified even pixel video signal to a digital sequence of even pixel values using a fixed reference voltage value;

a second analog-to digital (A/D) converter for converting a zeroed and amplified odd pixel video signal to a digital sequence of odd pixel values using a variable reference voltage value;

a first digital-to-analog (D/A) converter for converting the digital sequence of even pixel values to an even feedback signal;

a second digital-to-analog (D/A) converter for converting the digital sequence of odd pixel values to an odd feedback signal; and a difference integrator circuit that compares the odd feedback signal to-the even feedback signal and generates the variable reference voltage; and the pixel recombining circuit includes:

a multiplexer for sequentially combining the digital sequence of even pixel values from the first A/D converter with the digital sequence of odd pixel values from the second A/D converter to produce a digital sequence of even and odd pixel values; and a digital-to-analog (D/A) converter for converting the digital sequence of even and odd pixel values to the analog filtered video signal.

20. A preprocessing circuit for web inspection system that inspects a moving web for defects, the web inspection system including a charge-coupled device (CCD) camera that uses a scan array comprised of a plurality of pixel photosites to produce an analog raw video signal representative of the moving web, the raw video signal being comprised of an even pixel video signal and an odd pixel video stream and at least one pixel photosite for the even pixel video signal and one pixel photosite for the odd pixel video signal being internally masked within the CCD camera, each of the even pixel video signal and the odd pixel video signal including a sync pulse for each scan period and having an inherent maximum signal-to-noise (S/N) ratio, and a post processing system that receives a filtered video signal and evaluates the filtered video signal to detect video signals representative of defects in the moving web that are as small as a scan area in the moving web that is scanned by a single one of the plurality of pixel photosites, the preprocessing circuit comprising:

a pair of separate adaptive feedback loops, a first adaptive feedback loop DC-coupled to the CCD camera to process the even pixel video signal and a second adaptive feedback loop DC-coupled to the CCD camera to process the odd pixel video signal, each adaptive feedback loop utilizing a portion of the raw video signal corresponding to the at least one pixel photosite that is internally masked to remove a dark level DC offset in the raw video signal and generate a zeroed video signal;

an automatic pixel balancing circuit that balances a zeroed even pixel video signal with a zeroed odd pixel video signal to generate a balanced even pixel video signal and a balanced odd pixel video signal; and a pixel recombining circuit that multiplexes the balanced even pixel video signal and the balanced odd pixel video signal to generate the filtered video signal for each scan period, such that the filtered video signal has a preprocessing maximum S/N ratio no greater than the inherent maximum S/N ratio of the raw video signal.

* * * * *